(12) United States Patent
Miki et al.

(10) Patent No.: US 8,982,752 B2
(45) Date of Patent: Mar. 17, 2015

(54) BASE STATION APPARATUS AND USER TERMINAL

(75) Inventors: Nobuhiko Miki, Tokyo (JP); Kazuaki Takeda, Tokyo (JP); Yuan Yan, Tokyo (JP); Anxin Li, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 181 days.

(21) Appl. No.: 13/639,285

(22) PCT Filed: Mar. 30, 2011

(86) PCT No.: PCT/JP2011/057954
§ 371 (c)(1),
(2), (4) Date: Nov. 19, 2012

(87) PCT Pub. No.: WO2011/125701
PCT Pub. Date: Oct. 13, 2011

(65) Prior Publication Data
US 2013/0058294 A1    Mar. 7, 2013

(30) Foreign Application Priority Data

Apr. 5, 2010    (JP) .................................. 2010-087383

(51) Int. Cl.
*H04B 7/00* (2006.01)
*H04L 5/00* (2006.01)
*H04W 72/04* (2009.01)

(52) U.S. Cl.
CPC .............. *H04L 5/0007* (2013.01); *H04L 5/001* (2013.01); *H04L 5/0053* (2013.01); *H04W 72/042* (2013.01)
USPC .......................................... 370/310; 370/343

(58) Field of Classification Search
None
See application file for complete search history.

(56) References Cited

U.S. PATENT DOCUMENTS

| 8,432,859 | B2 * | 4/2013 | Lee et al. ....................... 370/329 |
| 2010/0195604 | A1 * | 8/2010 | Papasakellariou et al. ... 370/329 |
| 2010/0302983 | A1 * | 12/2010 | McBeath et al. .............. 370/311 |

(Continued)

FOREIGN PATENT DOCUMENTS

| WO | 2010103841 A1 | 9/2010 |
| WO | 2011/024646 A1 | 3/2011 |

OTHER PUBLICATIONS

International Search Report w/translation issued in PCT/JP2011/057954 mailed May 17, 2011 (4 pages).

(Continued)

*Primary Examiner* — Kevin C Harper
(74) *Attorney, Agent, or Firm* — Osha Liang LLP

(57) ABSTRACT

The present invention provides a search space configuration that is suitable for a communication system in which a plurality of fundamental frequency blocks are grouped together into a wide band. A base station apparatus (20) has a selection section (302) that selects a system band in fundamental frequency block units, a downlink control information generation section (306) that generates downlink control information for demodulating the data channels that are sent separately in the selected fundamental frequency blocks, and arranges, in the downlink control channel of a specific fundamental frequency block among a plurality of fundamental frequency blocks, a search space in which downlink control information for the plurality of fundamental frequency blocks is contained, and a transmission section (203) that transmits the downlink control channel in which the search space with the downlink control information is arranged.

6 Claims, 20 Drawing Sheets

(56) References Cited

U.S. PATENT DOCUMENTS

| | | | |
|---|---|---|---|
| 2011/0070845 A1* | 3/2011 | Chen et al. | 455/91 |
| 2011/0170495 A1* | 7/2011 | Earnshaw et al. | 370/329 |
| 2011/0205978 A1* | 8/2011 | Nory et al. | 370/329 |
| 2011/0317655 A1 | 12/2011 | Nakao et al. | |
| 2012/0157143 A1 | 6/2012 | Tsunekawa et al. | |

OTHER PUBLICATIONS

Panasonic; "Further discussion on PDCCH with cross carrier operation"; 3GPP TSG-RAN WG1 Meeting #59bis, R1-100361; Valencia, Spain; Jan. 18-22, 2010 (6 pages).

Qualcomm Europe; "PHICH for Multicarrier Operation"; 3GPP TSG RAN WG1 #58, R1-093120; Shenzhen, China; Aug. 24-28, 2009 (3 pages).

Huawei; "PUCCH design for carrier aggregation"; 3GPP TSG RAN WG1 Meeting #57, R1-091810; San Francisco, USA; May 4-8, 2009 (8 pages).

NEC Group; "Further discussion on DCI format for clustered DFT-S-OFDM"; 3GPP TSG RAN WG1 Meeting #59bis, R1-100303; Valencia, Spain; Jan. 18-22, 2010 (3 pages).

3GPP TS 36.212 V8.4.0; "3rd Generation Partnership Project; Technical Specification Group Radio Access Network; Evolved Universal Terrestrial Radio Access (E-UTRA); Multiplexing and channel coding (Release 8)"; Sep. 2008 (56 pages).

3GPP TS 36.213 V8.4.0; "3rd Generation Partnership Project; Technical Specification Group Radio Access Network; Evolved Universal Terrestrial Radio Access (E-UTRA); Physical layer procedures (Release 8)"; Sep. 2008 (60 pages).

3GPP TS 36.211 V8.4.0; "3rd Generation Partnership Project; Technical Specification Group Radio Access Network; Evolved Universal Terrestrial Radio Access (E-UTRA); Physical Channels and Modulation (Release 8)"; Sep. 2008 (78 pages).

Notification of Reasons for Rejection for Japanese Application No. 2010-087383 dated Jan. 29, 2013, with English translation thereof (11 pages).

Decision to Grant issued in Japanese Patent Application No. 2010-087383, mailing date Dec. 10, 2013, with English translation thereof (5 pages).

Office Action for corresponding Japanese Application No. 2010-087383, mailed Sep. 17, 2013 (5 pages).

LG Electronics; "Construction of PDCCH search spaces for cross-carrier scheduling in carrier aggregation;" 3GPP TSG RAN WG1 #60, R1-101347; San Francisco, USA; Feb. 22-26, 2010 (4 pages).

Office Action in counterpart Japanese Patent Application No. 2013-234039 issued on Jun. 3, 2014 (7 pages).

Panasonic; "Blind decoding in carrier aggregation"; 3GPP TSG-RAN WG1 Meeting #60, R1-101251; San Francisco, USA; Jan. 22-26, 2010 (3 pages).

\* cited by examiner

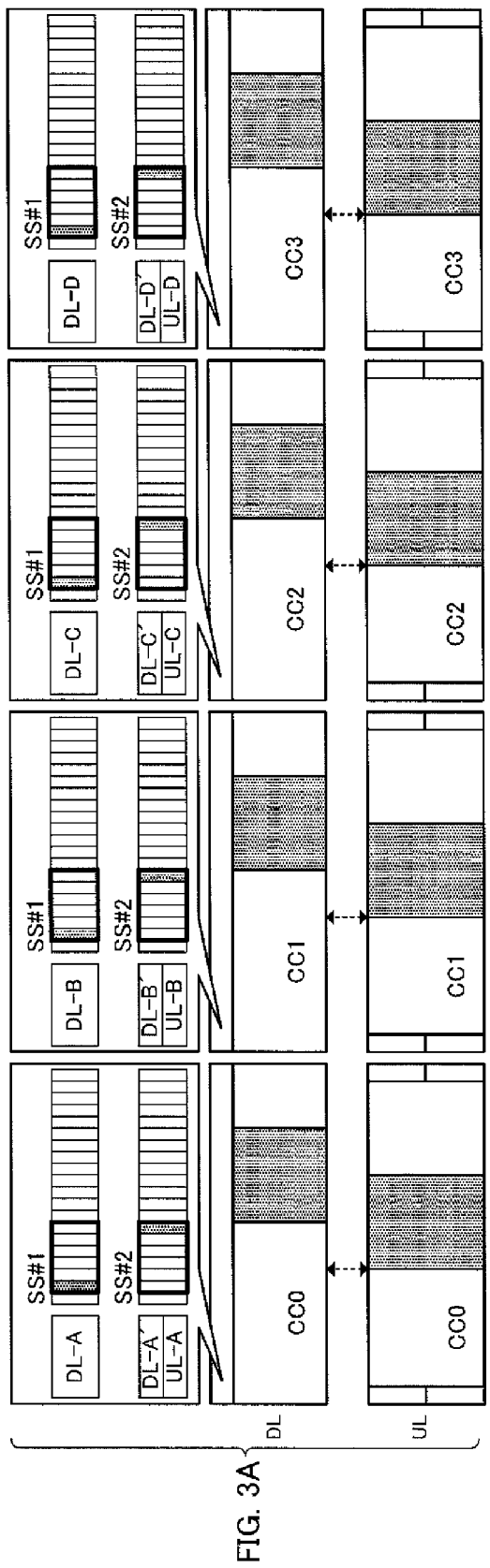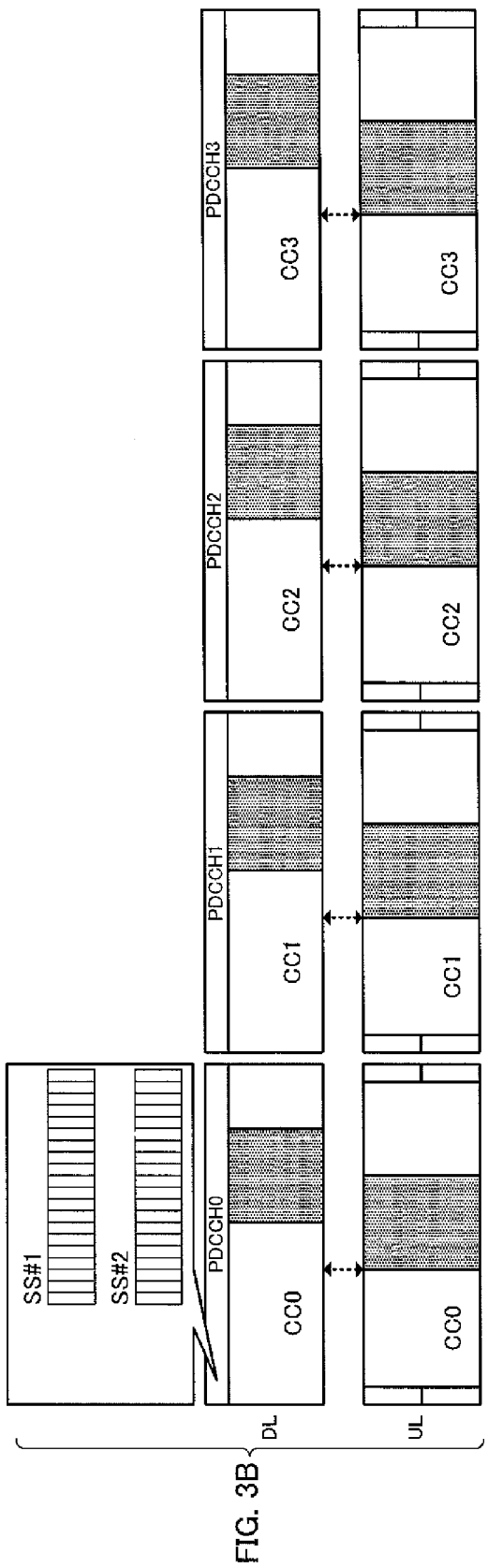
FIG. 3A
FIG. 3B

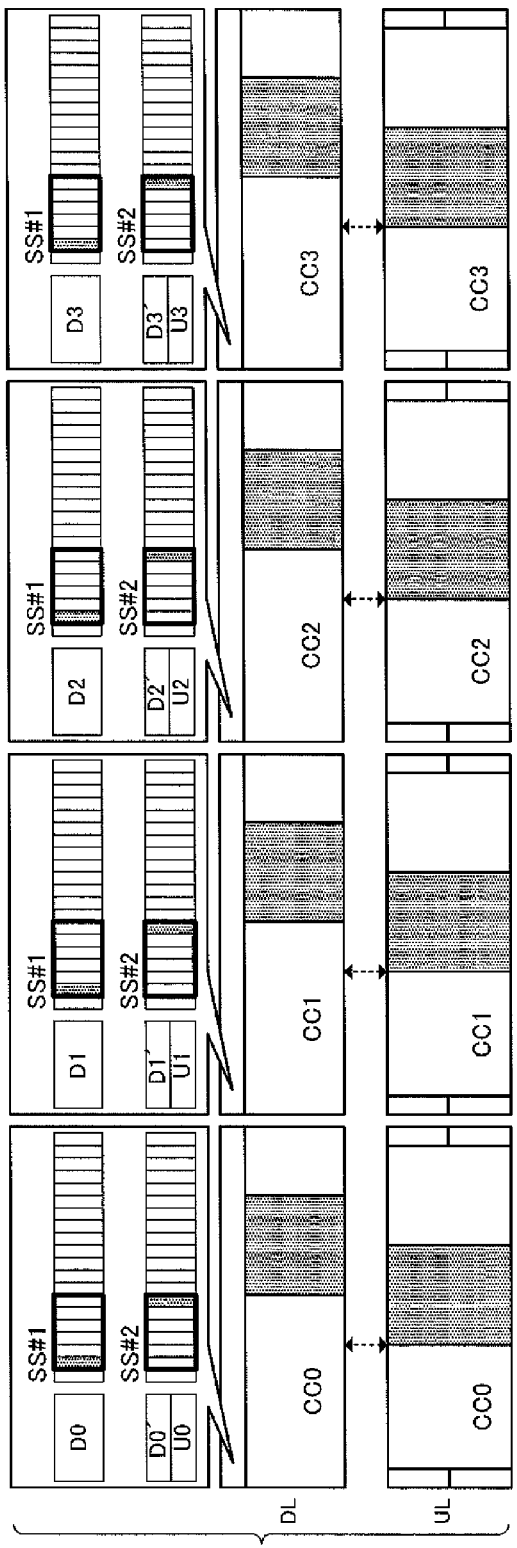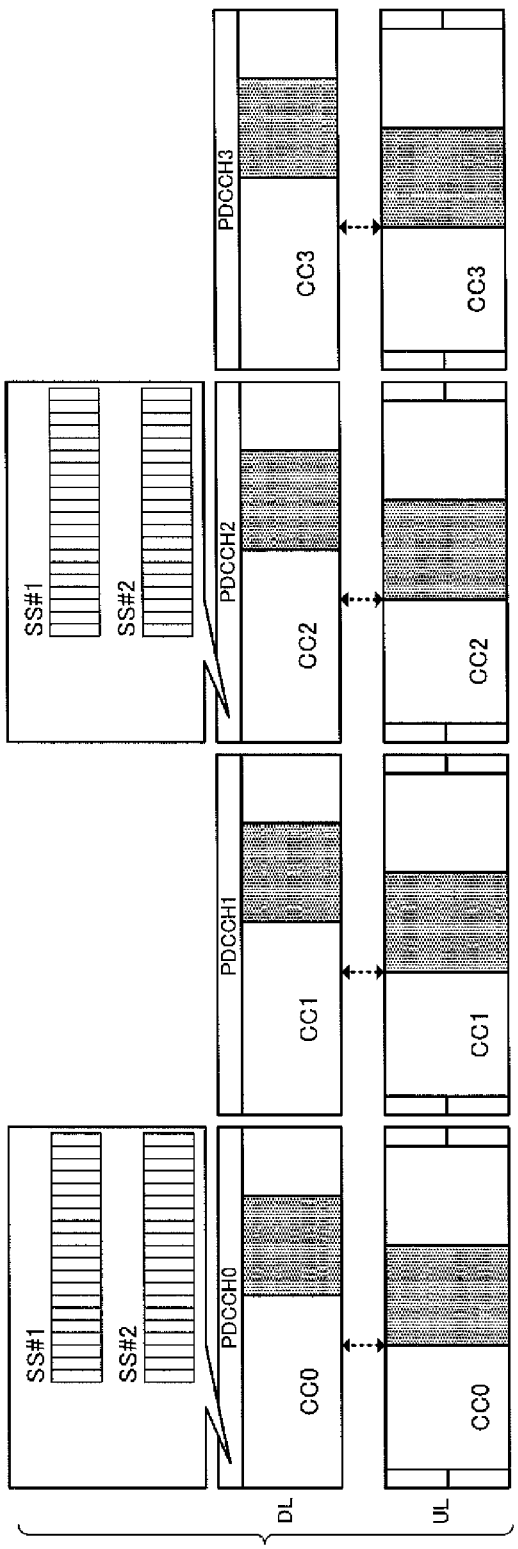
FIG. 4A
FIG. 4B

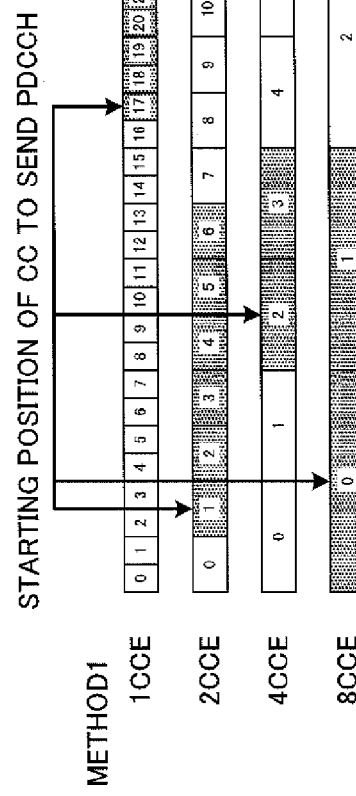
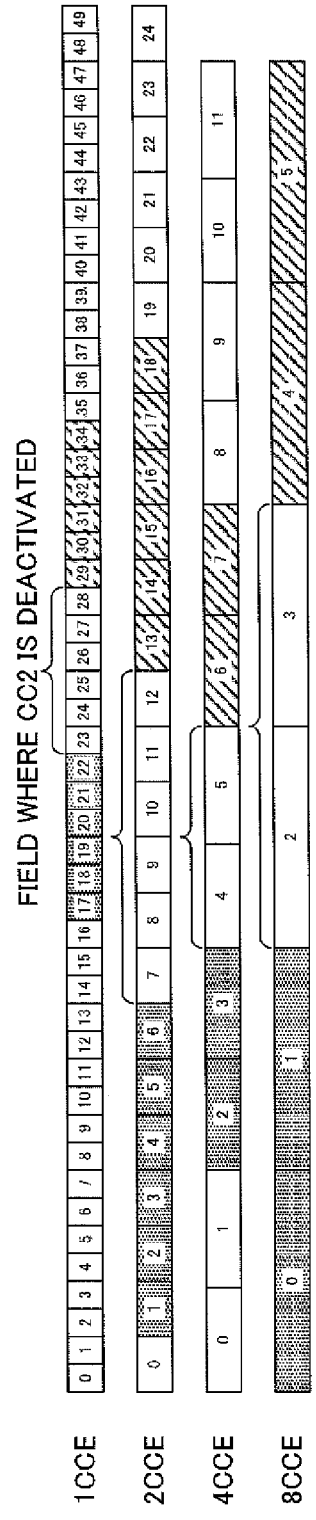
FIG. 12A
FIG. 12B

FIG. 15

BASE STATION APPARATUS AND USER TERMINAL

TECHNICAL FIELD

The present invention relates to a radio communication system that communicates by allocating a plurality of fundamental frequency blocks (hereinafter referred to as "component carriers") dynamically or semi-statically. More particularly, the present invention relates to a base station apparatus and a user terminal that transmit and receive downlink control channels under carrier aggregation.

BACKGROUND ART

The communication scheme to be a successor of W-CDMA (Wideband Code Division Multiple Access) and HSDPA (High Speed Downlink Packet Access), that is, long-term evolution (LTE), has been set forth by 3GPP, which is the standards organization of W-CDMA, and, for radio access schemes, OFDMA (Orthogonal Frequency Division Multiple Access) has been employed on the downlink and SC-FDMA (Single-Carrier Frequency Division Multiple Access) has been employed on the uplink. Presently, 3GPP is studying the successor system of LTE (referred to as "LTE-Advanced" including Release 10 and including versions after Release 10). LTE-Advanced hereinafter will be abbreviated as "LTE-A."

The LTE system is a system to perform communication by sharing one, two, or a greater number of physical channels by a plurality of mobile stations UEs, on both the uplink and the downlink. A channel that is shared by a plurality of mobile stations UEs is generally referred to as a shared channel (or also referred to as "data channel"), and, in LTE, is the PUSCH (Physical Uplink Shared Channel) on the uplink or the PDSCH (Physical Downlink Shared Channel) on the downlink.

In a communication system using shared channels such as the LTE system, to which mobile stations UEs the above shared channels are allocated needs to be signaled per transmission time interval (TTI) (or per subframe in LTE). The PDCCH (Physical Downlink Control Channel) is defined as the downlink control channel to be used for the above signaling. A mobile station UE receives the PDCCH and performs blind decoding, thereby extracting downlink control information for that mobile station UE. In LTE, the search space, which defines the resource range where a mobile station has to perform blind decoding, is defined in order to reduce the load of blind decoding on the mobile station. The base station signals downlink control information for the mobile station by arranging the downlink control information in the search space. The mobile station UE does not subject the whole range of the PDCCH to blind decoding, and performs blind decoding only on the search space in the PDCCH, and acquires the downlink control information for the subject station.

CITATION LIST

Non-Patent Literature

Non-Patent Literature 1: 3GPP, TS36.211 (V.8.4.0), "Evolved Universal Terrestrial Radio Access (E-UTRA); Physical Channels and Modulation (Release 8)", September 2008

Non-Patent Literature 2: 3GPP, TS36.212 (V.8.4.0), "Evolved Universal Terrestrial Radio Access (E-UTRA); Multiplexing and Channel Coding (Release 8)", September 2008

Non-Patent Literature 3: 3GPP, TS36.213 (V.8.4.0), "Evolved Universal Terrestrial Radio Access (E-UTRA); Physical Layer Procedures (Release 8)", September 2008

SUMMARY OF INVENTION

Problem to be Solved by the Invention

Now, in LTE-A, which is presently under study by 3GPP, there is an agreement to widen the band by gathering and grouping a plurality of component carriers (carrier aggregation).

It is therefore an object of the present invention to provide a base station apparatus and a user terminal that can realize a search space configuration that is suitable to transmit and receive a downlink control channel in a communication system in which a plurality of component carriers are aggregated together into a wide band.

Means for Solving the Problem

A base station apparatus according to the present invention has: a selection section configured to select a downlink and uplink system band to be used in radio communication with a user terminal in units of fundamental frequency blocks; a downlink control information generation section configured to generate downlink control information for demodulating data channels that are sent in the respective selected fundamental frequency blocks, and arrange, in a downlink control channel of a specific fundamental frequency block among the fundamental frequency blocks constituting the system band, a search space in which the downlink control information of the fundamental frequency blocks is included; and a transmission section configured to transmit the downlink control channel in which the search space including the downlink control information is arranged by the downlink control information generation section.

Advantageous Effects of the Invention

According to the present invention, it is possible to provide a search space configuration that is suitable for a communication system in which a plurality of component carriers is aggregated into a wide band.

BRIEF DESCRIPTION OF DRAWINGS

FIG. 3 provides diagrams showing a system band formed with four component carriers and search space configurations;

FIG. 4 provides diagrams showing search space configurations when component carriers are grouped;

FIG. 12 provides diagrams to explain mapping of search spaces for carrier aggregation;

FIG. 15 is a diagram showing a search space configuration of each component carrier when an offset is applied;

DESCRIPTION OF EMBODIMENTS

In the communication system to which the present invention is applied, carrier aggregation to form a system band by adding or removing a plurality of component carriers is performed. Carrier aggregation will be described with reference to FIG. 1.

Figure 1:
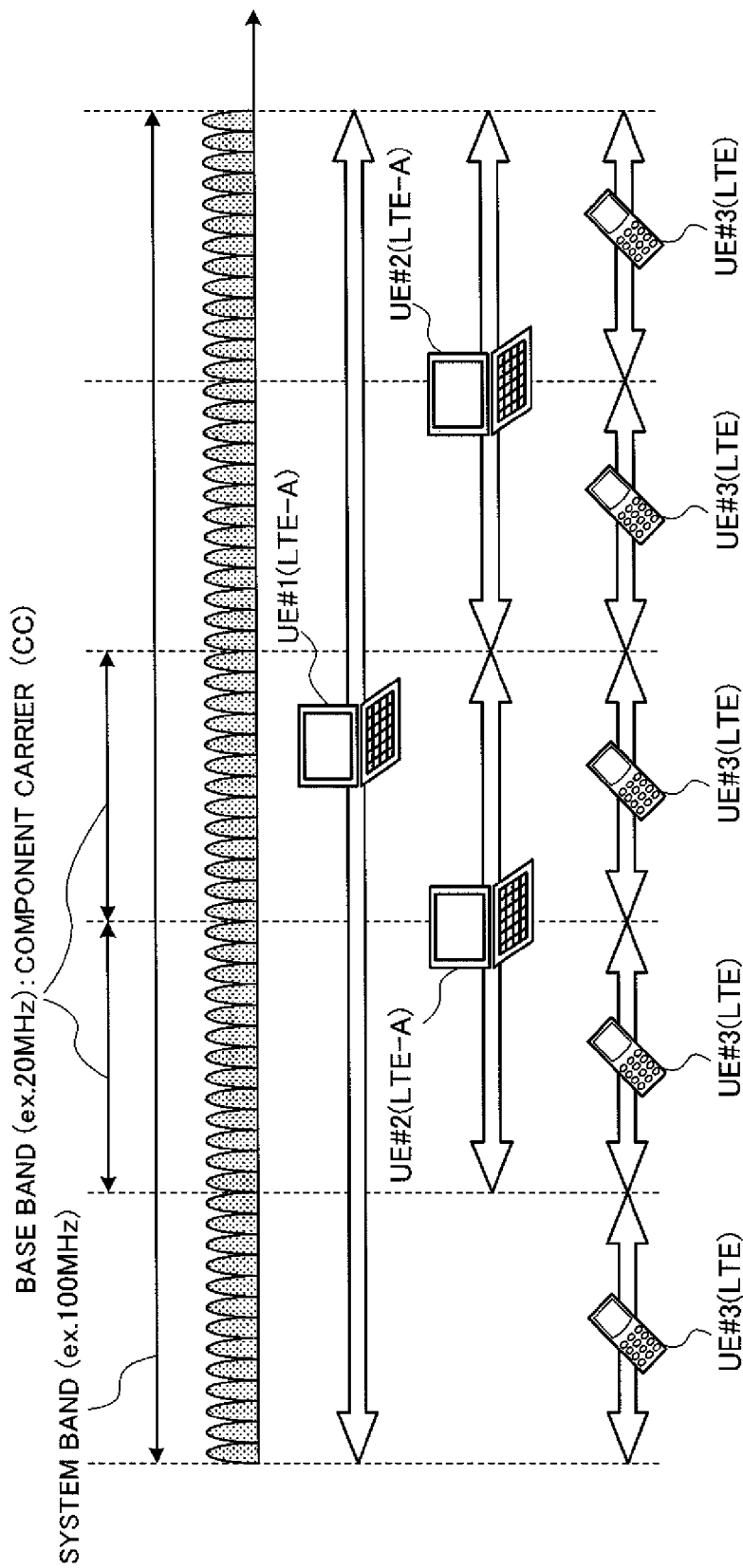
FIG. 1 is a diagram showing a layered bandwidth configuration defined in LTE-A.

FIG. 1 is a diagram showing a layered bandwidth configuration that is agreed in LTE-A. The example shown in FIG. 1 is a layered bandwidth configuration in the event the LTE-A system, which is a first mobile communication system to have a first system band formed with a plurality of component carriers (CCs), and the LTE system, which is a second mobile communication system to have a second system band formed with one component carrier, coexist. In the LTE-A system, radio communication is performed using, for example, a variable system bandwidth of maximum 100 MHz, and, in the LTE system, radio communication is performed using a variable system bandwidth of maximum 20 MHz. The system band of the LTE-A system includes at least one component carrier, where the system band of the LTE system is one unit, and increases or decreases the number of component carriers dynamically or semi-statically. Aggregating a plurality of component carriers into a wideband in this way is referred to as "carrier aggregation."

For example, in FIG. 1, the system band of the LTE-A system is a system band to include bands of five component carriers (20 MHz×5=100 MHz), where the system band of the LTE system (base band: 20 MHz) is one component carrier. In FIG. 1, a mobile station UE (User Equipment) #1 is a user terminal to support the LTE-A system (and also support the LTE system), and is able to support a system band up to 100 MHz. UE #2 is a user terminal to support the LTE-A system (and also support the LTE system), and is able to support a system band up to 40 MHz (20 MHz×2=40 MHz). UE #3 is a user terminal to support the LTE system (and not support the LTE-A system), and is able to support a system band up to 20 MHz (base band).

The present inventors have contemplated a search space arrangement to realize optimal PDCCH transmission/reception in the event a plurality of component carriers is aggregated in the LTE-A system, and arrived at the present invention.

According to one aspect of the present invention, in the LTE-A system, when the system band is formed with a plurality of component carriers, the search spaces of the plurality of component carriers to constitute the system band are mapped to the downlink control channel of one component carrier. The search spaces of all the component carriers may be mapped to one component carrier as well. Alternately, it is equally possible to divide the plurality of component carriers to constitute the system band into a plurality of groups, and map the search spaces of a plurality of component carriers in the same group to one component carrier in the same group.

FIG. 2 provides conceptual diagrams of user-specific search spaces (UE-specific search spaces) SS defined in LTE. Two search spaces of varying blind decoding sizes are defined. The blind decoding sizes may be determined according to the size (the DCI size) of downlink control information (DCI), and the DCI size is determined by the transmission mode and bandwidth of the component carriers. If the transmission mode is the same between aggregated component carriers, the DCI size is determined by the bandwidth of the component carriers.

LTE defines a plurality of DCI formats of varying DCI sizes (of varying types of blind decoding, in other words). One is DCI format 1 (shown as "D0" in FIG. 2), and the other one is DCI format 1A (shown as "D0'" in FIG. 2), which is a compact-type DCI format that makes "D0" compact, and which is used mainly for users at cell edges. Also, for DCI for uplink assignment information, DCI format 0 (shown as "U0" in FIG. 2) of the same size as DCI format 1A, which is a DCI format for downlink compact assignment, is defined.

Two types of search spaces (search space SS1 and search space SS2) are assigned to the PDCCH of component carrier CC0. DCI format 1 (D0) is arranged in search space SS1, and D0' and U0 having the same bit size are arranged in common search space SS2. The DCI (Format 1) to be arranged in search space SS1 is a control signal for demodulation of the PDSCH of component carrier CC0, and the DCI (Format 0) to be arranged in search space SS2 is a control signal for demodulation of the uplink PUSCH of the same component carrier CC0.

Figure 2A:
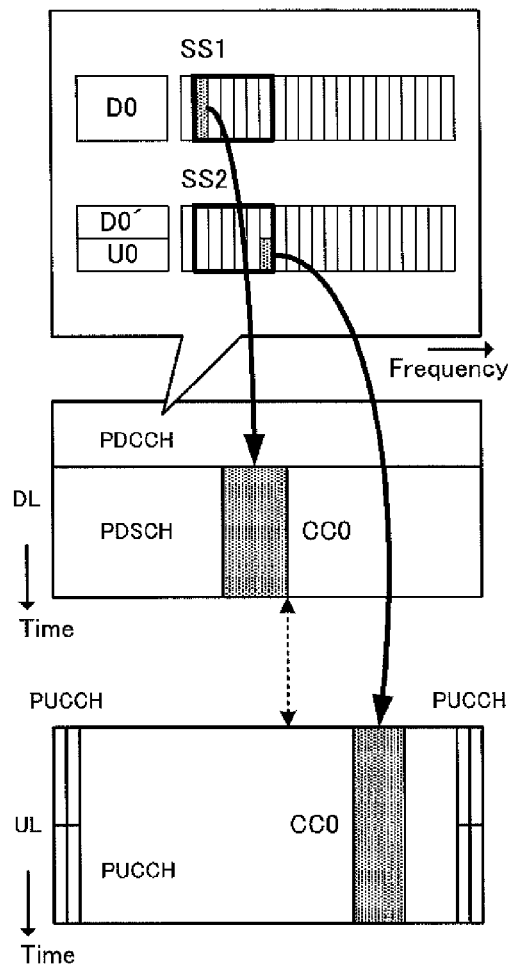
FIG. 2 provides conceptual diagrams of user-specific search spaces defined in LTE.
Figure 2B:
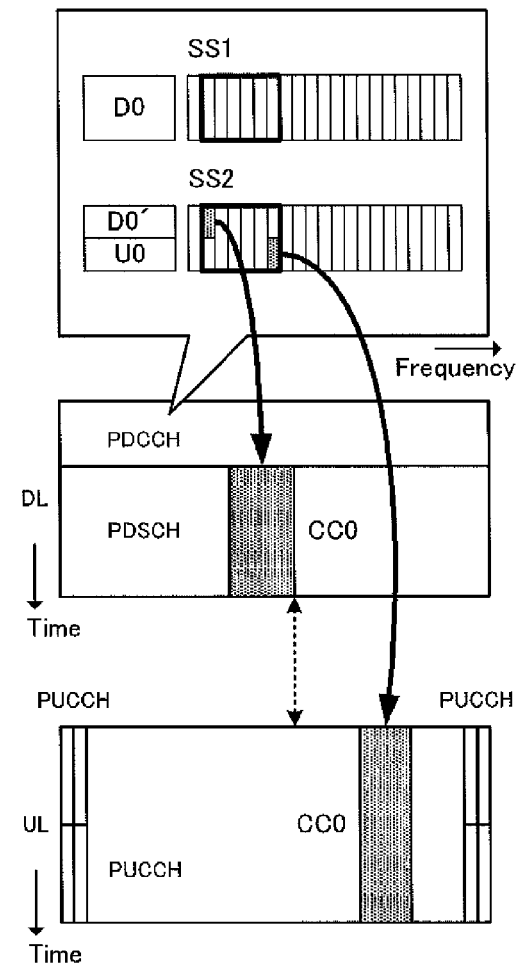

FIG. 2A is an example where downlink assignment information (D0) is arranged in one search space SS1 and uplink assignment information (U0) is arranged in the other search space SS2. FIG. 2B shows a case where DCI format 1A, which is a DCI format for compact assignment, is selected for downlink assignment information, and "D0'" and "U0" are arranged in the common search space SS2.

A configuration to map the search spaces of a plurality of component carriers to constitute the system band to the downlink control channel of one component carrier will be described with reference to FIG. 3 and FIG. 4. As for the component carriers shown as examples in FIG. 3 and FIG. 4, all the component carriers have the same bandwidth and hold a symmetric relationship between the downlink component carriers and the uplink component carriers.

FIG. 3 shows a system band formed with four component carriers CC0 to CC3, and shows downlink component carriers (DL), uplink component carriers (UL) and search spaces SSs arranged in the PDCCHs of the downlink component carriers. FIG. 3A shows an example of arranging search spaces according to the rules of LTE illustrated in FIG. 2. As shown in FIG. 3A, search spaces SS1 and SS2 are arranged in the PDCCH of each of the downlink component carriers (DL).

FIG. 3B shows a configuration in which the search spaces of a plurality of component carriers CC0 to CC3 are mapped to PDCCH0 of one component carrier CC0. In one search space SS1 mapped to PDCCH0, downlink assignment information D0 to D3 of all the component carriers CC0 to CC3 are arranged. Also, in the other search space SS2 mapped to PDCCH0, uplink assignment information U0 to U3 of all the component carriers CC0 to CC3 are arranged. Note that, in the event compact-type uplink assignment information D0' to D3' are used, compact-type downlink assignment information D0' to D3' and uplink assignment information U0 to U3 are arranged in the search space SS2.

Now, the method of identifying downlink assignment information D0 to D3 (D0' to D3') and uplink assignment information U0 to U3 for a plurality of component carriers CC0 to CC3, arranged in the same search space SS, will be described.

An identifier (hereinafter referred to as "carrier indicator") that can specify the original component carrier (meaning the component carrier where the shared data channel (PDSCH) to be demodulated using each downlink assignment information (D0 to D3)/(D0' to D3') is transmitted) is attached to DCI format 1/1A in which downlink assignment information (D0 to D3)/(D0' to D3') is arranged. The field in which the carrier indicator is arranged on DCI format 1/1A may be referred to as the CIF (Carrier Indicator Field). A CIF to indicate the original component carrier is likewise provided in DCI format 0 where uplink assignment information U0 to U3 is arranged.

Consequently, when a user terminal having received PDCCH0 of the component carrier CC0 performs blind decoding of the search space SS1 of PDCCH0, although D0 to D3 are all demodulated at the same time in one blind decoding, it is still possible to identify which component carrier each downlink assignment information is associated with, by analyzing the CIFs that are separately provided in D0 to D3. Likewise, when blind decoding is performed for the search space SS2 of PDCCH0, U0 to U3 are all demodulated at the same time in one blind decoding, it is still possible to identify which component carrier each uplink assignment information is associated with, by analyzing the CIFs of U0 to U3.

FIG. 4 shows a system band formed with four component carriers CC0 to CC3, showing an example where a plurality of component carriers to constitute the system band is divided into a plurality of groups and search spaces are mapped in group units. FIG. 4A shows the same subject matter as in FIG. 3A. FIG. 4B shows an example of mapping search spaces for a plurality of component carriers in the same group to one component carrier in the same group, per group. To be more specific, the whole of the system band is divided into the first group of component carriers CC0 and CC1 and a second group of component carriers CC2 and CC3. The search spaces of the component carriers CC0 and CC1 in the first group are mapped to PDCCH0 of one component carrier CC0 in the same group, and the search spaces of the component carriers CC2 and CC3 in the second group are mapped to PDCCH2 of one component carrier CC2 in the same group.

For example, with the example shown in FIG. 3, when the communication quality of the component carrier CC0 is good and the communication quality of PDCCH1 to PDCCH3 of the other component carriers CC1 to CC3 is poor, uplink/downlink assignment information, which is important information, can be signaled using PDCCH0 of the component carrier CC0 of good communication quality. Also, as shown in FIG. 4B, by dividing component carriers into a number of groups and specifying the component carrier to use to transmit downlink control information in each group, it is equally possible to prevent the increase in number of component carriers (which may also be referred to as the number of DCIs) to be arranged in one search space.

Figure 5A:
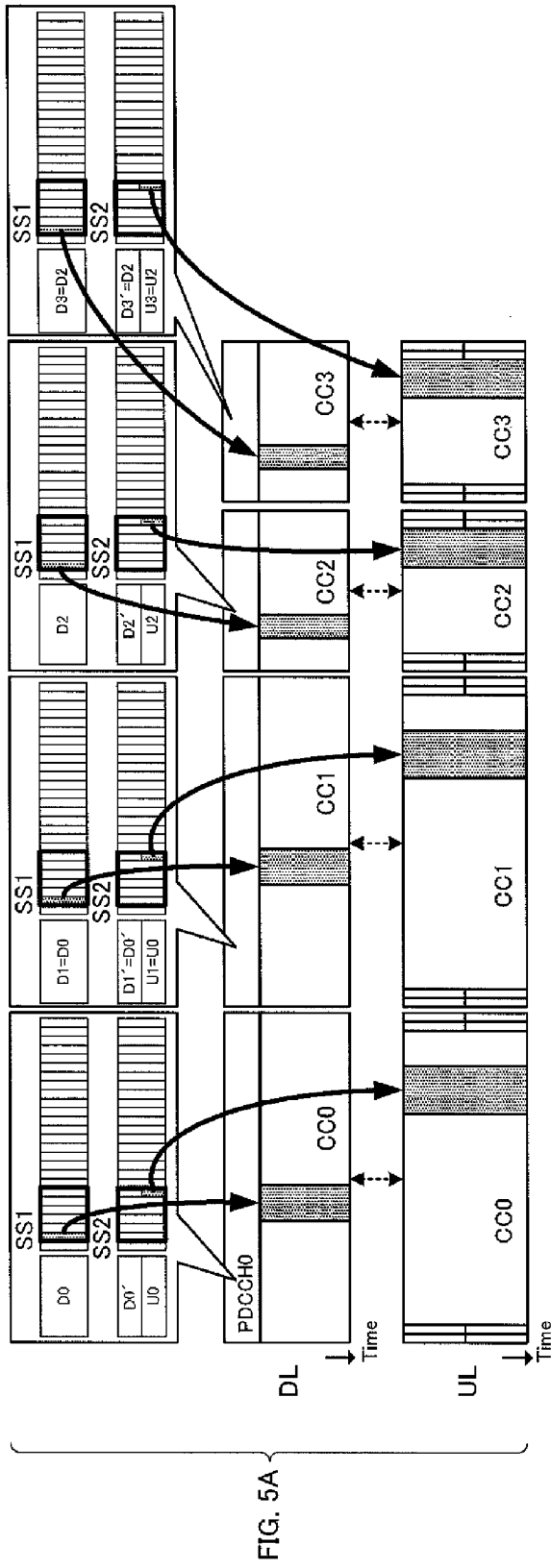
FIG. 5 provides diagrams showing a system band formed with a plurality of component carriers and other search space configurations.

Next, a search space configuration that is suitable to a system band where component carriers of varying bandwidths coexist will be described. FIG. 5 illustrates a system band formed with four component carriers CC0 to CC3, where two component carriers CC0 and CC1 have the same bandwidth, and the other two component carriers CC2 and CC3 have the same bandwidth, and this bandwidth is different from the bandwidth of CC0 and CC1. The uplink component carriers and downlink component carriers are symmetric. Note that the search space arrangement shown in FIG. 5A is the same arrangement as in FIG. 3A and FIG. 4A.

Figure 5B:
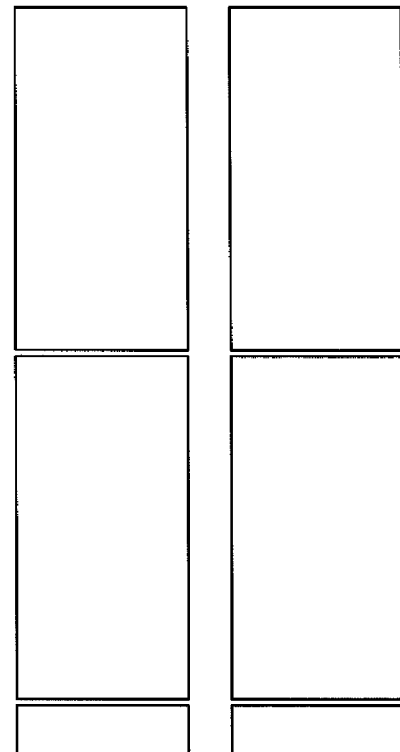

For example, in the example of FIG. 5 of carrier aggregation to transmit downlink control information including uplink/downlink assignment information using the PDCCHs of CCs, downlink assignment information D0 and D1 of the component carriers CC0 and CC1 having the same bandwidth has the same size, so that, as shown in FIG. 5B, the common search space SS1 (D0/1) for CC0 and CC1 is formed in the search space SS1 of CC0. Also, downlink assignment information D2 and D3 of the component carriers CC2 and CC3 having the same bandwidth has the same size, so that, as shown in FIG. 5B, the common search space SS1 (D2/3) for CC2 and CC3 is formed in the search space SS1. Consequently, in the search space SS1 for downlink assignment information, the two common search spaces SS1 (D0/1) and SS1 (D2/3) coexist.

Also, uplink assignment information U0 and U1 of the component carriers CC0 and CC1 has the same size, so that the common search space SS2 (U0/1) for CC0 and CC1 is formed in the search space SS2. Also, uplink assignment information U2 and U3 of the component carriers CC2 and CC3 has the same size, so that, as shown in FIG. 5B, the common search space SS2 (U2/3) for CC2 and CC3 is formed in the search space SS2. Consequently, in the search space SS2 for uplink assignment information, the two common search spaces SS2 (U0/1) and SS2 (U2/3) coexist. Note that D0'/D1' and D2'/D3' of compact type, having the same DCI size, may be arranged in common search spaces SS2 (U0/1) and SS2 (U2/3). "C" represents the CIFs attached separately to the downlink assignment information (D0, D1, D2 and D3) and uplink assignment information (U0, U1, U2 and U3).

It is equally possible to define one component carrier as an anchor carrier, in a communication system (for example, LTE-A) to aggregate a plurality of component carriers and secure a wide-range system band as a whole. The anchor carrier may be defined to constantly guarantee the same operations as in LTE. To guarantee the same operations as in LTE, the CIF cannot be included in the DCI format. Also, in the event the same operations as in LTE are not guaranteed, by defining a specific component carrier as a reference component carrier (anchor carrier) and identifying that reference component carrier between the base station apparatus and the user terminal, it is still possible to specify component carriers without attaching a CIF to the DCI of the reference component carrier.

Given this, when a plurality of component carriers are grouped together and a wide-range system band is secured on the whole, there is a possibility that there are component carriers in which CIFs are not attached to the DCIs.

Figure 5C:
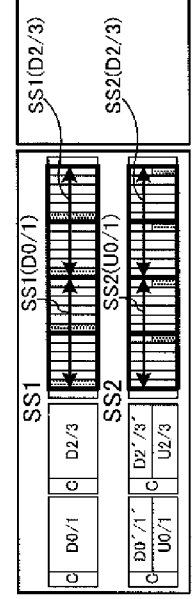

FIG. 5C shows a search space arrangement when a CIF is not attached to downlink assignment information D0 and uplink assignment information U0 of the component carrier CC0. Since the CIF is removed from the DCI of the component carrier CC0, the DCI size varies between D0/D0' and D1/D1'. Likewise, the DCI sizes of U0 and U1 vary. The search space arrangement shown in FIG. 5C is a configuration to separate a search space every DCI size. The search space SS1 in which downlink assignment information is arranged is formed with a search space SS1 (D0) where D0 without a CIF is arranged, a search space SS1 (D1) where D1 with a CIF is arranged, and a common search space SS1 (D2/3) where D2 and D3 of the same size with CIFs are arranged. The search space SS2 in which uplink assignment information is arranged is formed with a search space SS2 (U0) where U0 without a CIF is arranged, a search space SS2 (U1) where U1 with a CIF is arranged, and a common search space SS2 (U2/3) where U2 and U3 of the same size with CIFs are arranged. Note that it is equally possible to arrange D0', D1', D2' and D3' of compact type, that are the same size as uplink assignment information U1 and so on, in corresponding places in the search space SS2.

Figure 6A:
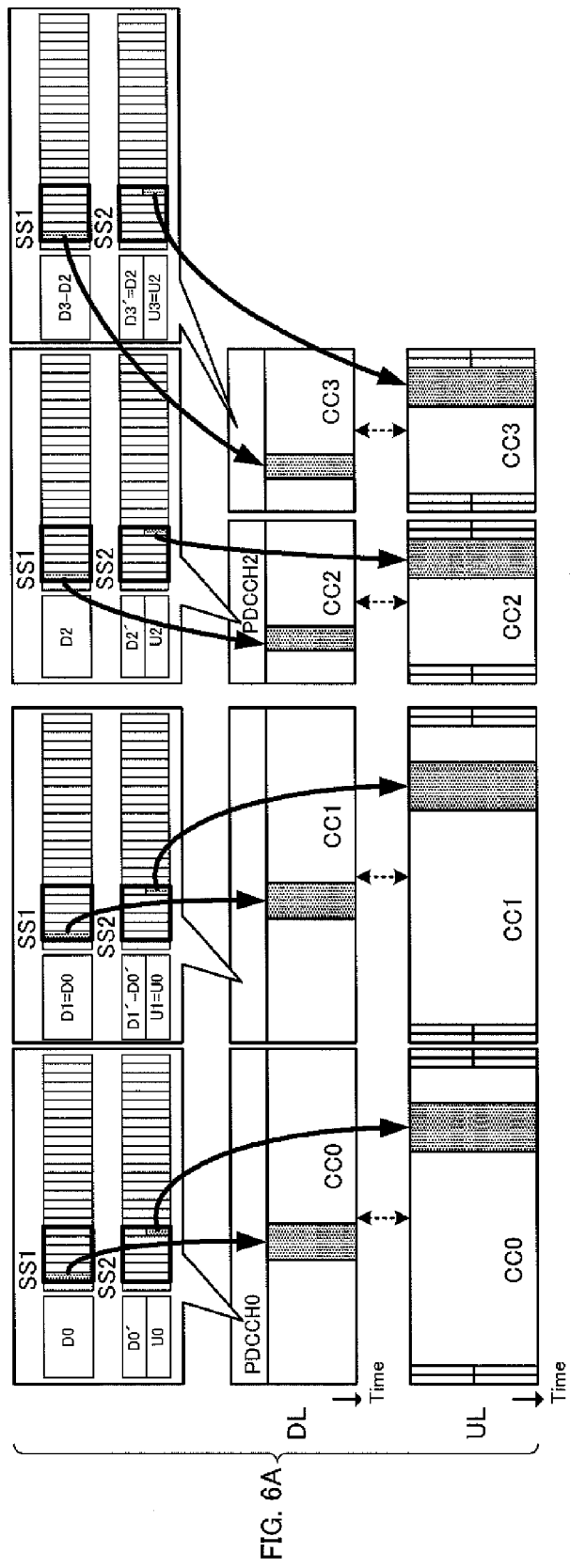
FIG. 6 provides diagrams showing a system band formed with a plurality of component carriers and other search space configurations.

FIG. 6 illustrates a system band formed with four component carriers CC0 to CC3, where two component carriers CC0 and CC1 have the same bandwidth, and the other two component carriers CC2 and CC3 have the same bandwidth, and this bandwidth is different from the bandwidth of CC0 and CC1. Note that the search space arrangement shown in FIG. 6A is the same search space arrangement as in FIG. 5A.

Figure 6B:
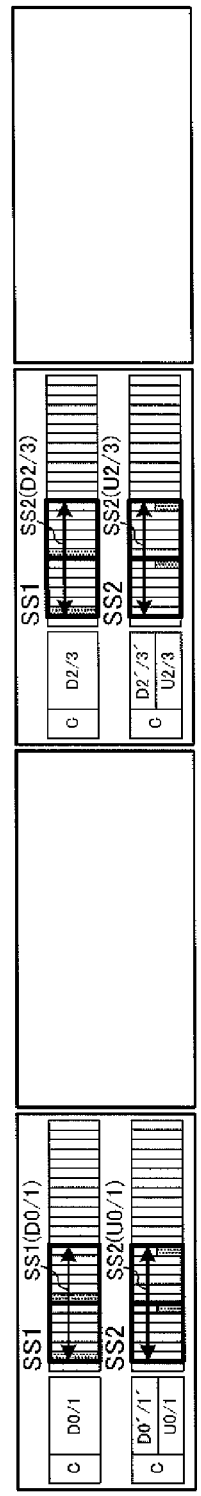
Figure 6C:
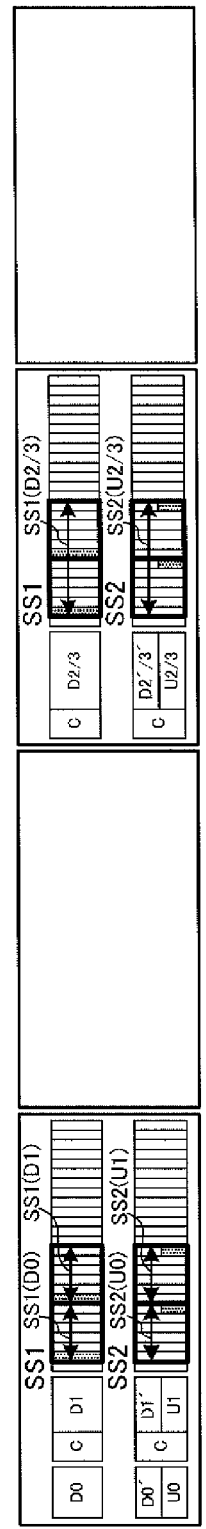

Downlink assignment information D0 and D1 of the component carriers CC0 and CC1 having the same bandwidth is arranged in the search spaces SS1/2 of PDCCH0 of the component carrier CC0 as shown in FIGS. 6B and 6C, and downlink assignment information D2 and D3 of the component carriers CC2 and CC3 that have the same bandwidth is arranged in the search spaces SS1/2 of PDCCH2 of the component carrier CC2 as shown in FIGS. 6B and 6C.

FIG. 6B shows a search space arrangement in the event CIFs are attached to all of downlink assignment information D0 to D3 (D0' to D3') and uplink assignment information U0 to U3. Common search space SS1 (D0/1) for CC0 and CC1 is arranged in the search space SS1 of PDCCH0, and common search space SS1 (D2/3) for CC2 and CC3 is arranged in the search space SS1 of PDCCH2. Common search space SS2 (U0/1) for CC0 and CC1 is arranged in the search space SS2 of PDCCH0, and common search space SS2 (U2/3) for CC2 and CC3 is arranged in search space SS2 of PDCCH2.

FIG. 6C is the same as the search space configuration shown in FIG. 6B in grouping search spaces SS1 and SS2 into anchor carriers CC0 and CC2 of the respective groups (which may be referred to as "reference component carriers"), but is different in not attaching CIFs to assignment information D0 and U0 of one anchor carrier CC0. A configuration is equally possible where CIFs are not attached to assignment information D2 and U2 of the other anchor carrier CC2, and, in this case, it is preferable to use the same configuration as the search spaces of assignment information D0 and U0 of the one anchor carrier CC0.

Since SC-FDMA is employed as the uplink radio access scheme in LTE, the DCI size of uplink assignment information is made the same as the DCI size of compact-type downlink assignment information (DCI format 1A). On, the other hand, in LTE-A, there is an agreement to employ clustered DFT-spread OFDM, which allocates a plurality of clusters, as the uplink radio access scheme. Since the volume of information of uplink resource allocation information becomes large in clustered DFT-spread OFDM, a larger DCI size than DCI format 1A is preferable. Also, in LTE-A, there is an agreement to apply MIMO transmission to the uplink, and, from that aspect, too, uplink resource allocation information increases.

So, apart from DCI format 0, which is made to match the DCI size of compact-type downlink assignment information (DCI format 1A), a DCI format (hereinafter referred to as "DCI format 0A") having an expanded number of resource allocation bits over DCI format 0 is defined. In the PDCCH, a search space to arrange DCI format 0A is set.

According to another aspect of the present invention, in the LTE-A system, search spaces to support the three DCI sizes of DCI format 1, DCI format 0/1A and DCI format 0A are arranged in the PDCCH, and the user terminal performs blind decoding of the three types of DCI formats.

Figure 7:
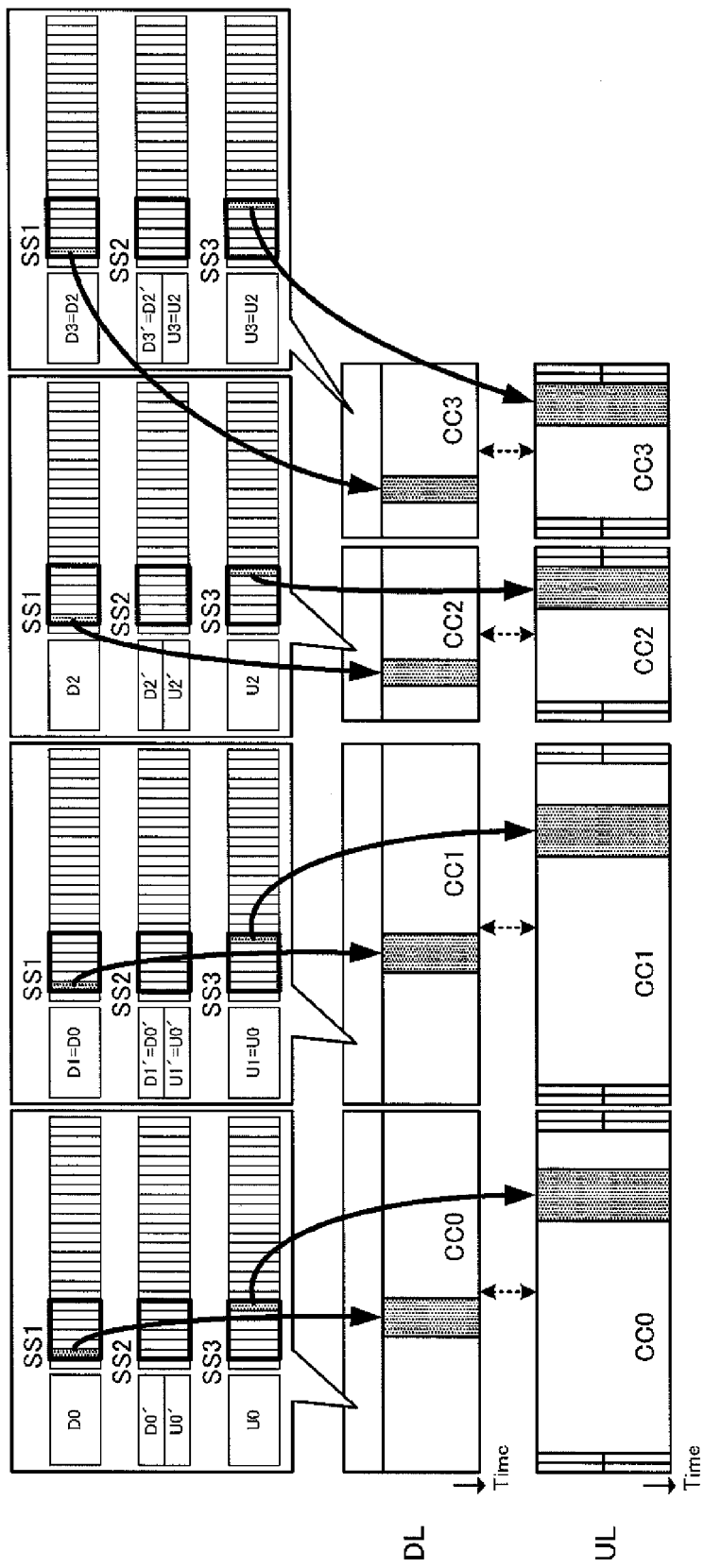
FIG. 7 provides diagrams showing a system band configuration and search space arrangement where 3 types of search spaces are arranged.

FIG. 7 illustrates a system band configuration and search space arrangement where three types of search spaces are arranged. This drawing illustrates a system band formed with four component carriers CC0 to CC3, where two component carriers CC0 and CC1 have the same bandwidth, and the other two component carriers CC2 and CC3 have the same bandwidth, and this bandwidth is different from the bandwidth of CC0 and CC1. In the PDCCH of each of the component carriers CC0 to CC3, three types of search spaces SS1, SS2 and SS3 are arranged. For example, the search spaces arranged in the PDCCH of the component carrier CC0 will be described as an example. The first search space SS1 in which downlink assignment information D0 of DCI format 1 having a first DCI size is arranged, the second search space SS2 in which downlink assignment information D0' and U0' of DCI format 1A or DCI format 0 having a second DCI size are arranged, and the third search space SS3 in which uplink assignment information U0 of DCI format 0A having a third DCI size is arranged, are arranged in the PDCCH.

In FIG. 7, although downlink assignment information D0' and uplink assignment information U0" are not allocated in the second search space SS2, when a downlink control signal is signaled to a user terminal at a cell edge or to a user terminal with little control information, downlink assignment information D0' and uplink assignment information U0" are allocated in the second search space SS2.

In this way, if the three types of search spaces SS1, SS2 and SS3 are applied on a selective basis, it is possible to make signaling by utilizing the second search space when the volume of information of downlink control signals needs to be reduced as for cell edge users in LTE, and make signaling by utilizing the third search space when the volume of information of uplink assignment information is large.

Figure 8:
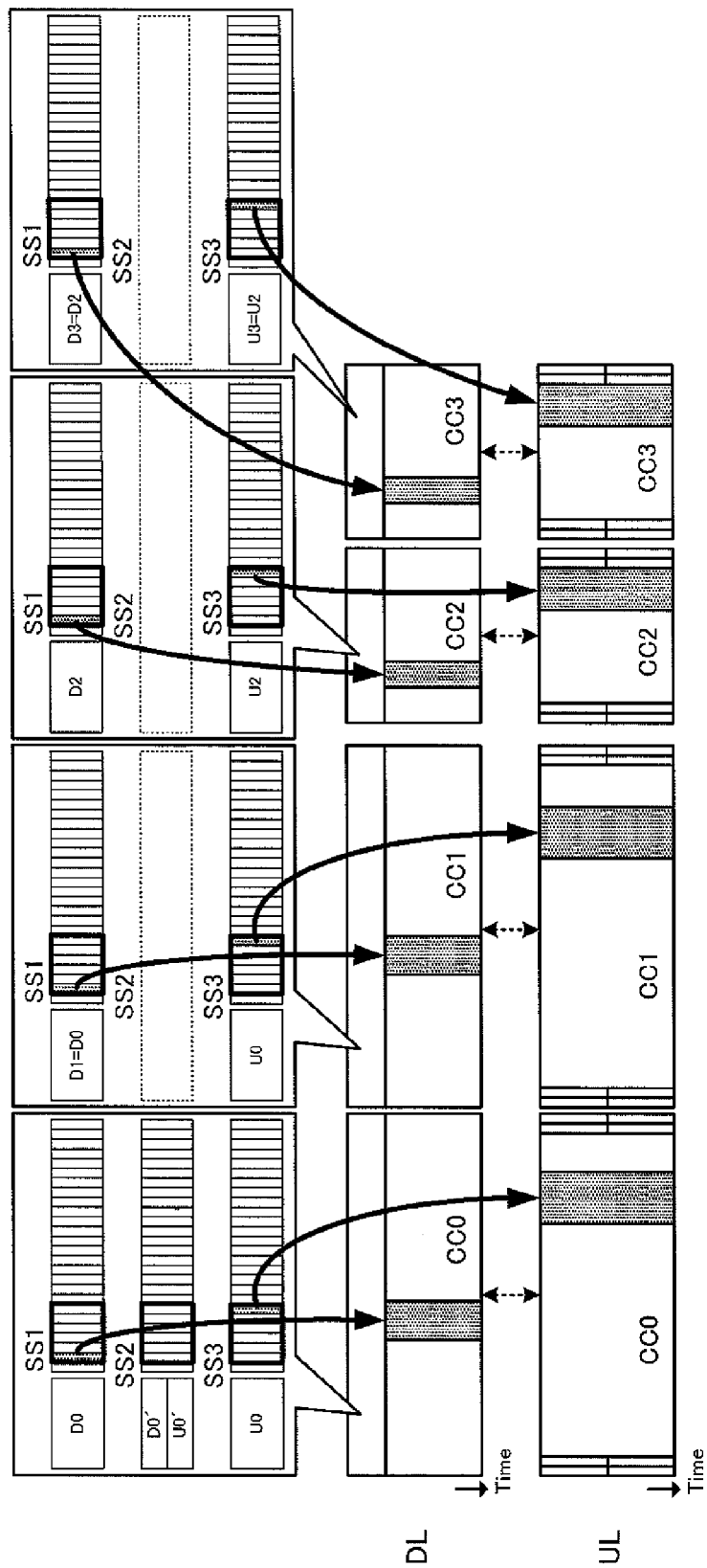
FIG. 8 is a conceptual diagram to support fallback only in the anchor carrier.

As shown in FIG. 8, it is equally possible to support fallback to mode (DCI format 1A or DCI format 0) to use the second search space only in the anchor carrier (CC0). In the component carriers (CC1 to CC3) other than the anchor carrier (CC0), blind decoding of the second search space is not performed at the user terminal. In the event a band of good communication quality is allocated to the anchor carrier (CC0), it is possible to utilize the second search space of a small DCI size effectively, and reduce the load of the user terminal since two types of blind decoding are sufficient for carriers other than the anchor carrier (CC0).

Next, a search space arrangement that is suitable for a system band including a component carrier, in which only a downlink component carrier is assigned and an uplink component carrier is not assigned, and which is therefore asymmetric (hereinafter referred to as "asymmetric component carrier"), will be described.

Figure 9:
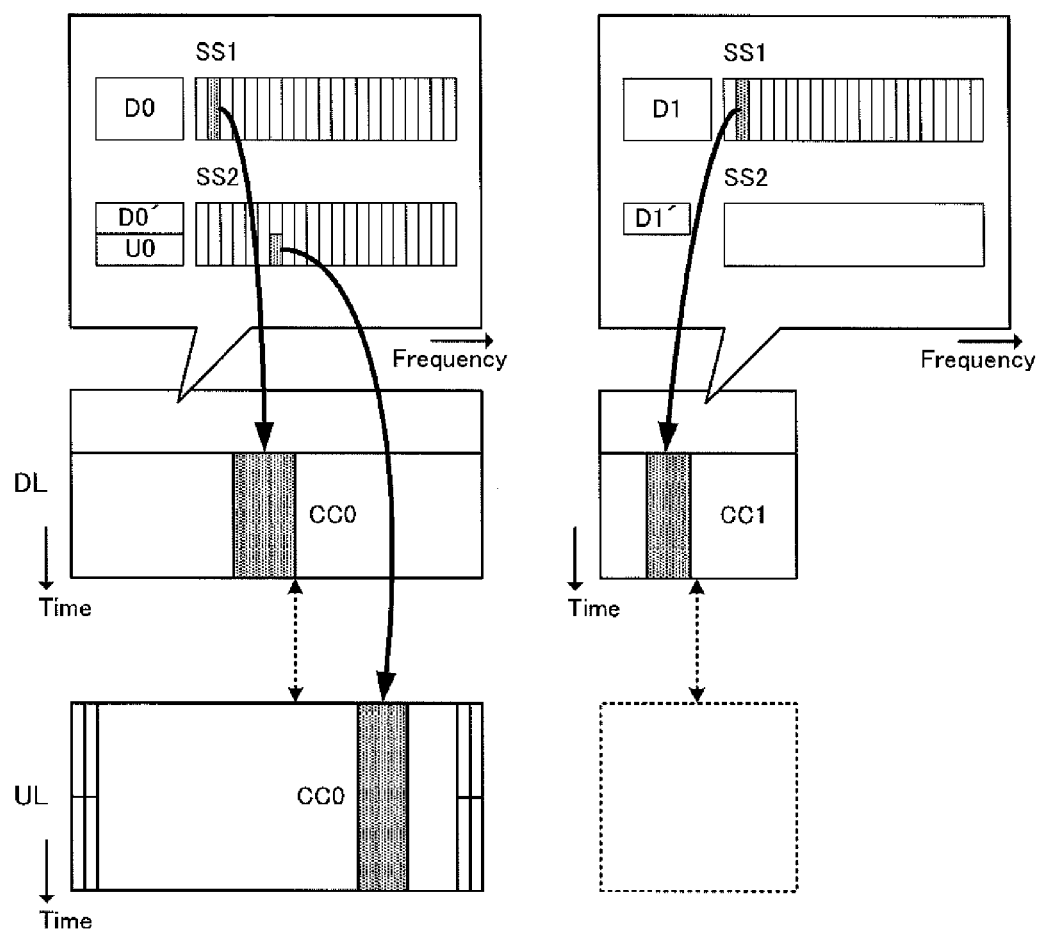
FIG. 9 is a diagram showing a system band and search space arrangement including an asymmetric component carrier.

FIG. 9 shows a system band and search space arrangement including an asymmetric component carrier. One component carrier CC0 is assigned a pair of an uplink component carrier and a downlink component carrier, but the other component carrier CC1 is assigned only a downlink component carrier and no uplink component carrier is assigned, thus constituting an asymmetric component carrier. As with component carrier CC0, a search space SS1 for downlink assignment information (DCI format 1), and a second search space SS2 for a compact size, where downlink assignment information D0'' (DCI format 0), which has a compact size compared to the downlink assignment information D0 (DCI format 1), and uplink assignment information U0 (DCI format 0) of the same size, can be allocated in pair, are arranged in the PDCCH. On the other hand, in the event of the asymmetric component carrier CC1, for information to place in the second search space SS2 for a compact size, there is only downlink assignment information D1' of a compact size compared to downlink assignment information D1.

The present inventors have carefully considered what should be arranged or should not be arranged in pair with compact-size downlink assignment information D1' in the second search space SS2, and, as a result, arrived at the present invention.

According to another aspect of the present invention, when, in the LTE-A system, a plurality of component carriers to constitute the system band includes an asymmetric component carrier, the search space of the asymmetric component carrier is formed with a search space SS1 for downlink assignment information D1 (DCI format 1) and a second search space SS2 for a compact size, in which only downlink assignment information D1' (DCI format 0) of a compact size compared to the downlink assignment information D1 is arranged. That is to say, the second search space SS2 for a compact size is not allocated a pair of downlink assignment information (DL) for the downlink component carrier and uplink assignment information (UL) for the uplink component carrier, and only the compact-type downlink assignment information D1' (DCI format 1A) for the downlink component carrier is arranged (option 2).

By this means, upon trying to arrange DCI in a pair of DL and UL in the second search space SS2 for a compact size as stipulated in LTE, if a pair is formed using uplink assignment information (UL) of another component carrier of a varying bandwidth, there arises a process of matching the size of the compact-type downlink assignment information in the asymmetric component carrier with the uplink assignment information (UL) of the other component carrier. With the present invention, such process can be prevented from arising.

Also, it is equally possible not to provide any second search space SS2 for a compact size in the search space for the asymmetric component carrier (option 3).

Also, it is equally possible to form a pair using uplink assignment information of another component carrier apart from the asymmetric component carrier (for example, uplink assignment information U0 of the component carrier CC0) (option 1). Although this raises a process of matching the size of compact-type downlink assignment information D1' in the asymmetric component carrier with the uplink assignment information (U0) of the other component carrier, as described above, there is an advantage of increasing the redundancy of signaling of uplink assignment information (for example, U0) of the other component carrier.

Figure 10:
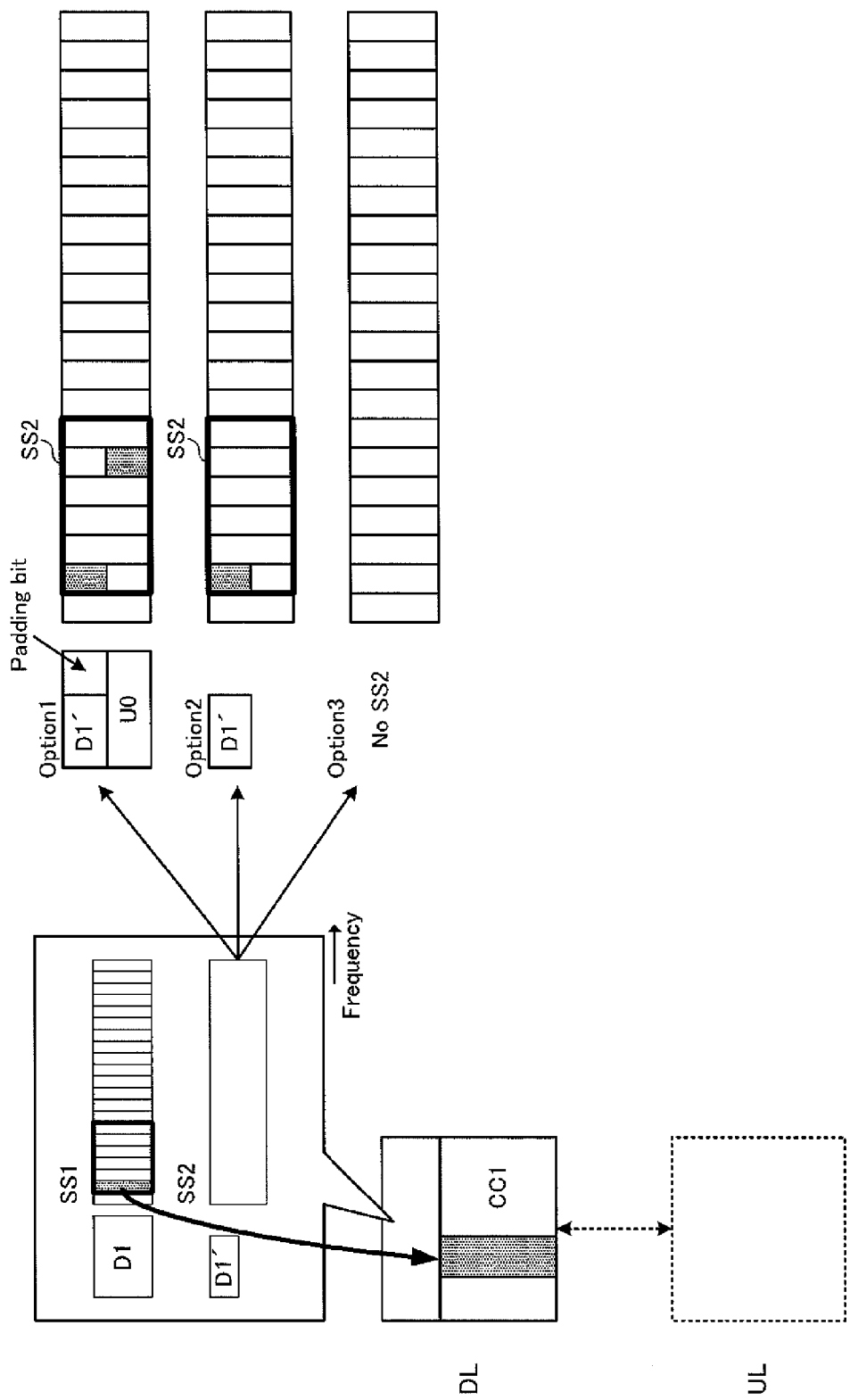
FIG. 10 is a diagram showing a configuration of a second search space for an asymmetric component carrier.

FIG. 10 shows specific examples of above options 1 to 3, illustrating configuration examples of the second search space SS2 for a compact size for asymmetric component carrier CC1 illustrated in FIG. 9.

In option 1, the second search space SS2 is defined, in which a pair of compact-type downlink assignment information D1' for the asymmetric component carrier CC1 and uplink assignment information U0 of the component carrier CC0 other than the asymmetric component carrier CC1, can be arranged.

Uplink assignment information U0 of the component carrier CC0 has a bigger bit size than compact-type downlink assignment information D1' of the asymmetric component carrier CC1. To make uplink assignment information U0 (CC0) and downlink assignment information D1' the same in blind decoding size to be allowed to be arranged in the second search space SS2, padding bits are added to the smaller downlink assignment information D1' so that its bit size matches with that of the bigger uplink assignment information U0. When the downlink assignment information D1' is arranged in the second search space SS2, the bit size is adjusted by adding padding bits to the downlink assignment information D1'.

By this means, it is possible to signal uplink assignment information U0 of the component carrier CC0 using the second search space of another component carrier CC1, and consequently it is possible to increase the redundancy of the uplink assignment information U0.

Also, if uplink assignment information UL is recycled from another component carrier having the same bandwidth (and the same transmission mode) as the asymmetric component carrier CC1, the compact-type downlink assignment information D1' and uplink assignment information UL become the same size, and the process of adding padding bits is not required.

In option 2, the second search space SS2 for a compact size, in which compact-type downlink assignment information D1' of the asymmetric component carrier CC1 alone is arranged, is defined. Since uplink assignment information U0 (CC0) of a different bit size is not recycled from another component carrier, the process of adding padding bits for matching the bit size of both does not arise, and it is therefore possible to simplify the process.

In option 3, the second search space SS2 for a compact size is not arranged in the asymmetric component carrier. By this means, it is possible to realize even more simplified process than option 2.

Figure 11:
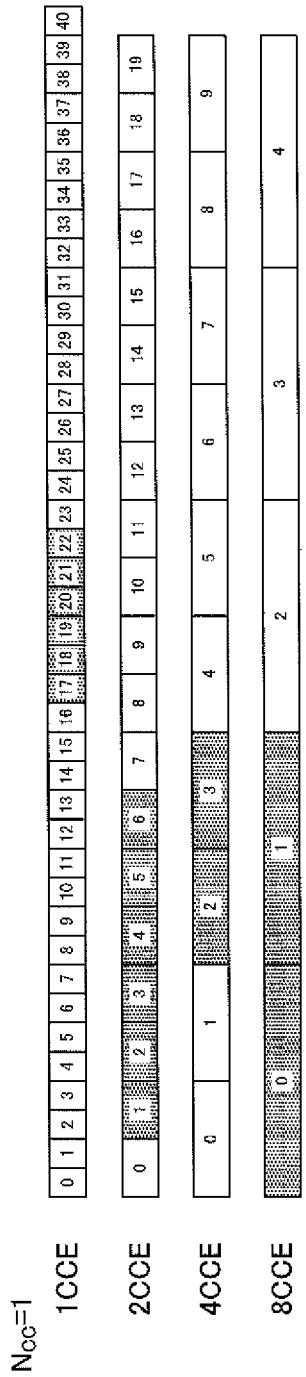
FIG. 11 is a diagram showing an example of arrangement of search spaces in the PDCCH when the number of carrier aggregations=1 component carrier.

Next, a plurality of search space arrangements for a plurality of component carriers on the PDCCH of one component carrier will be described. FIG. 11 shows an example of arrangement of a search space in the PDCCH when the number of carrier aggregations=1 component carrier.

In LTE, rate matching of downlink control information (DCI) to one of 72, 144, 288 and 576 bits (where the cases of 72 bits and 576 bits correspond to the coding rates of ⅔ and 1/12) is performed according to the reception quality of a user terminal. 72 bits is defined as the basic unit (CCE: Control Channel Element), and an optimal number of CCEs is determined according to reception quality, from 4 types of numbers of CCEs={1, 2, 4, 8}. The number of CCE aggregations is smaller for a user terminal of better reception quality, and the number of CCE aggregations is made bigger for a user terminal of poorer reception quality such as a user terminal located at a cell edge. In this way, the number of CCE aggregations (resources) for transmitting downlink control information (DCI) is determined per user terminal.

FIG. 11 shows an example of forming the PDCCH of a component carrier with 50 CCEs. When the number of CCEs=1, a search space SS is arranged in 6 CCEs (the range of CCE numbers 17 to 22), and, when the number of CCEs=2, a search space SS is arranged in 6 CCEs (the range of CCE numbers 1 to 6). When the number of CCEs=4, a search space SS is arranged in 2 CCEs (the range of CCE numbers 2 and 3), and, when the number of CCEs=8, a search space SS is arranged in 2 CCEs (the range of CCE numbers 0 and 1).

The present inventors have contemplated a search space arrangement which can control adequate search space arrangement according to the number of component-carrier aggregations and which has high compatibility to switch the search space arrangement adequately when the PDSCH is activated/deactivated, and, as a result, arrived at the present invention. Deactivation of the PDSCH refers to controlling the transmission power of the PDSCH to 0 or to a value close to 0, or controlling the transmission data of the PDSCH to be 0 or minimum information. Activation of the PDSCH refers to making the transmission power or transmission data of the PDSCH greater than a predetermined level.

According to another aspect of the present invention, when the search spaces in which downlink control information (DCI) for individual component carriers to constitute the system band is arranged are mapped to the downlink control channel of one component carrier, the search spaces for the individual component carriers are arranged in a consecutive manner based on the starting position of the search space for the component carrier to send the PDCCH.

By this means, only by signaling the component carrier number (CC number) to send the PDCCH and the CC number to send the PDSCH among a plurality of component carriers to constitute the system band, the user terminal is able to specify the search space of each component carrier. Also, since the search spaces are arranged in component carrier units, it is easy to deactivate only the search space of a component carrier with a deactivated PDSCH.

Now, search space mapping to arrange the search spaces of component carriers in a consecutive manner based on the starting position of the search space of the component carrier to send the PDCCH, will be described in detail with reference to FIG. 12.

The component carrier to send the PDCCH is CC1, and the PDCCH of the component carrier CC1 is formed with a bandwidth of 50 CCEs. In the PDCCH of the component carrier CC1, the search spaces of other component carriers CC2 and CC3 are arranged. When the number of CCE aggregations=1 and 2, the search spaces are formed with 6 CCEs, and, when the number of CCE aggregations=4 and 8, the search spaces are formed with 2 CCEs.

For example, as shown in FIG. 12A, when the number of CCE aggregations=1, the search space of the component carrier CC1 to send the PDCCH starts from the CCE number 17. Following the search space of CC1, the search space of CC2 is arranged, and, following the search space of CC2, the search space of CC3 is arranged. The same applies to cases of other numbers of CCE aggregations.

That is to say, if the starting position of the search space of the component carrier to send the PDCCH, the order of component carriers for which search spaces are arranged, and the size of the search spaces are learned, it is possible to specify the individual search spaces even when the search spaces of a plurality of CCs are arranged in the PDCCH of one CC. The size of the search spaces is determined by the number of CCE aggregations, so that it is not necessary to signal the search space size separately. It then follows that, only by newly signaling the CC number to send the PDCCH (in the above case, CC1) and the CC numbers to send the PDSCH (in the above case, CC2 and CC3), the user terminal is able to specify the search spaces of the component carriers (CC1 to CC3).

FIG. 12B shows the search space arrangement in the event CC2 is deactivated. As shown in this drawing, the search space of deactivated CC2 (for example, if the number of CCE aggregations=1, the CCE numbers 23 to 28) is deactivated. Only the search space of CC2 is deactivated, without influencing the positions of the search spaces of activated CC1 and CC3. When CC2 is activated again, it is only necessary to arrange the downlink control information (DCI) of CC2 in the original CC2 search space (CCE numbers 23 to 28).

In this way, a search space arrangement to arrange the search spaces of a plurality of component carriers in a consecutive manner readily supports the activation/deactivation of the PDSCH. Considering the false detection probability, when user-specific search spaces are mapped to different component carriers as described above, a configuration is preferable whereby the user-specific search spaces can also be deactivated.

As described above, in the event the search spaces of a plurality of component carriers are arranged in a consecutive manner, there are cases where the number of CCEs to constitute the search space needs not be increased in proportion to the number of component carriers. If the DCI size is the same between a plurality of component carriers, it is not necessary to increase the number of CCEs in proportion to the number of component carriers.

Figure 13:
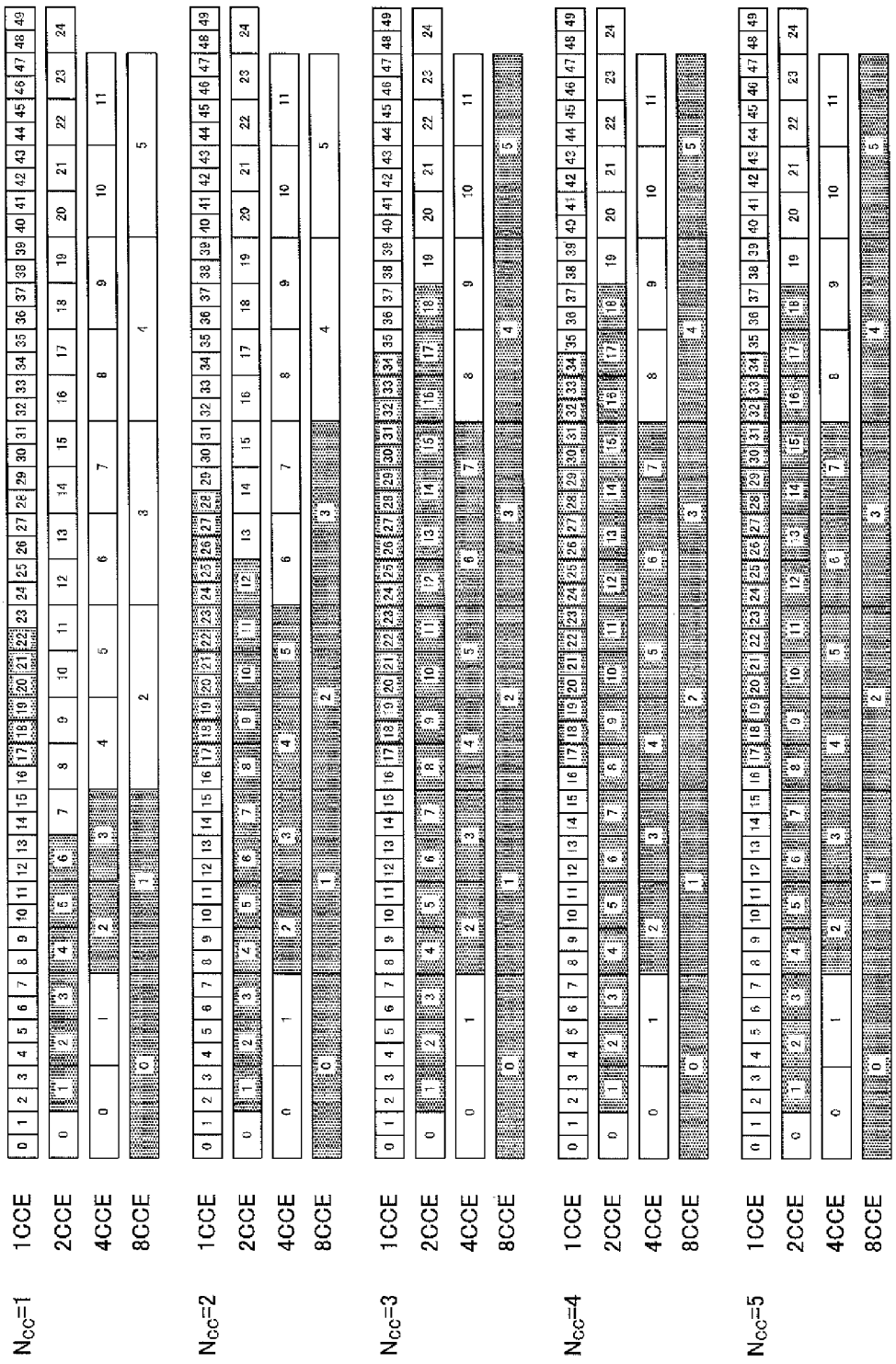
FIG. 13 is a diagram showing search space configurations of component carriers where the DCI size is the same.

FIG. 13 is a diagram showing a search space configuration for component carriers having the same DCI size. With respect to the numbers of CCs (Ncc) from Ncc=1 to Ncc=5, the search space is shown by hatching. When the number of CCs is from Ncc=1 to Ncc=3, the number of CCEs of the search space increases in proportion to the number of CCs.

For example, a case will be described here where the number of CCE aggregations is 1 CCE. When the number of CCs is Ncc=1, the number of CCEs=6 is allocated to the search space of 1 CC. Furthermore, when Ncc=2, the number of CCEs=12, which is double of 1 CC, is allocated in association with the search spaces for 2 CCs. When Ncc=3, the number of CCEs=18, which is triple of 1 CC, is allocated in association with the search spaces for 3 CCs. Up to Ncc=3, the same case applies as shown in FIG. 12A.

In the example shown in FIG. 13, the number of CCEs of the search spaces is maximum 18 CCEs. When the search space size is 18 CCEs at a maximum, it is possible to arrange DCIs for 5 CCs not to interfere with each other. Consequently, even when the number of CCs increases to Ncc=4 and Ncc=5, the search space is fixed to the number of CCEs=18 and does not increase in proportion to the number of CCs. By this means, if the DCI size is the same, it is possible to allocate DCIs in any position in the search space and therefore reduce the number of CCEs of the search space, by attaching a CIF to the DCI of each component carrier.

Also, by making the search spaces SSs partly overlap between component carriers CCs, it is possible to prevent increase in number of CCEs of the search spaces SSs even if the number of CC aggregations increases.

Figure 14:
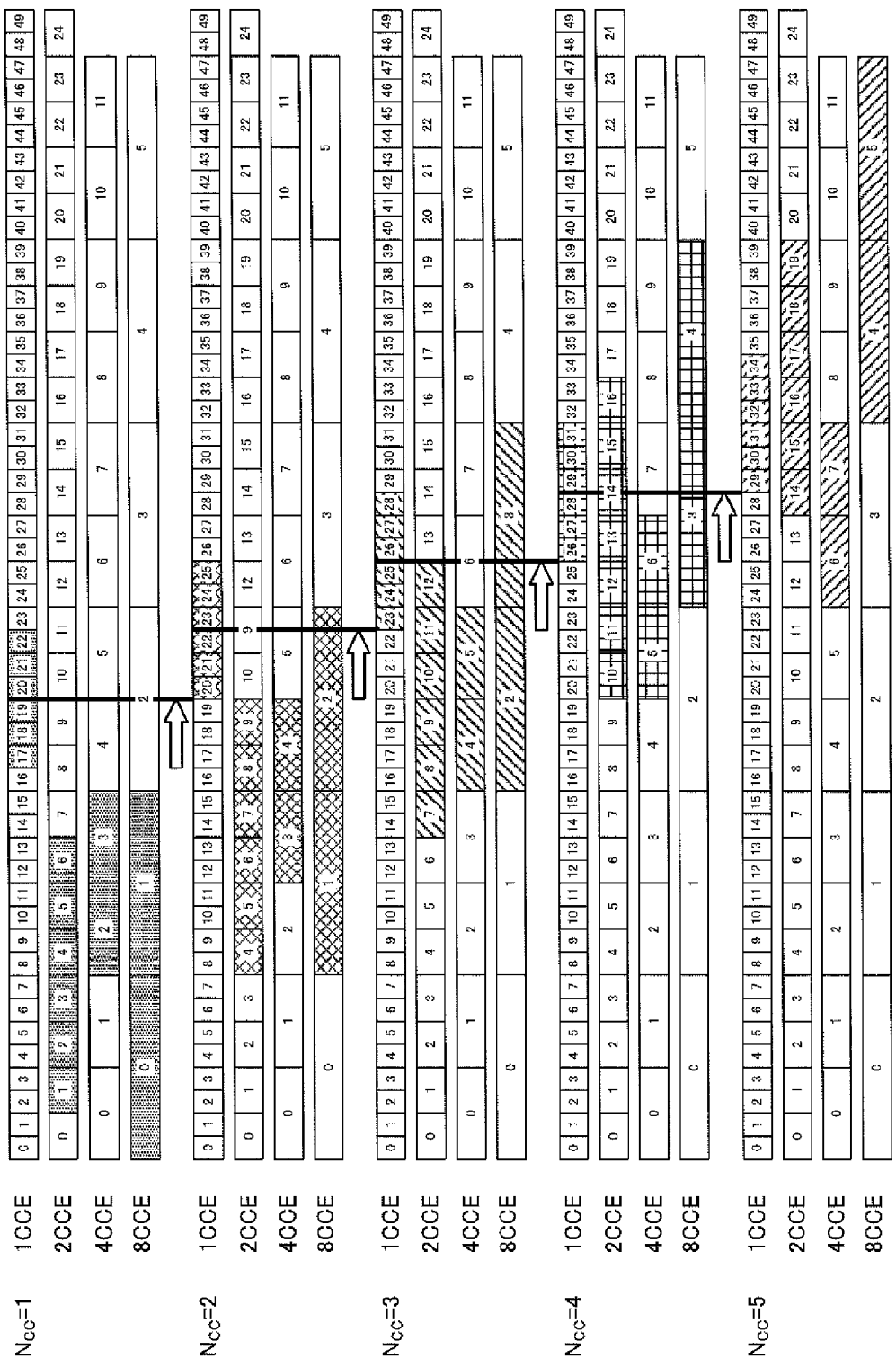
FIG. 14 is a diagram showing search space configurations when component carrier-specific offsets are applied to search spaces.

FIG. 14 is an example of arrangement in which the search spaces SSs partly overlap between component carriers CCs by applying component carrier CC-specific offsets to the search spaces SSs. Assuming that the number of CCE aggregations is N_level={1, 2, 4, 8} and the CCE size to correspond to the number of CCE aggregations is N_size={6, 12, 8, 16}, the offset amount=(N_size/N_level)/2 is calculated. Now, the unit of offset is the number of search spaces SSs at each level. This offset amount is designed so that the search spaces of neighboring CCs overlap approximately by half.

For example, to examine the case of Nlevel=1, when Ncc=1, there is 1 CCE, so that 6 CCEs from the CCE numbers 17 to 22 become the search space. When Ncc=2, the offset amount=3 CCEs, so that the CCE number 20 to CCE number 25 become the search space of the second CC. The search space to be secured in the PDCCH becomes the range of CCE numbers 17 to 25. When Ncc=3, the offset amount=3 CCEs, so that the CCE number 23 to CCE number 28 become the search space of the third CC. The search space to be secured in the PDCCH becomes the range of CCE numbers 17 to 28. When Ncc=4, the offset amount=3 CCEs, so that the CCE number 26 to CCE number 31 become the search space of the fourth CC. The search space to be secured in the PDCCH becomes the range of CCE numbers 17 to 31. When Ncc=5, the offset amount=3 CCEs, so that the CCE number 29 to CCE number 34 become the search space of the fourth CC. The search space to be secured in the PDCCH becomes the range of CCE numbers 17 to 34.

In this way, although the search space size increases in proportion to the number of CC aggregations, by applying component carrier-specific offsets to the search spaces, it is possible to reduce the increases of the search space size when the number of CC aggregations increases.

As described above, by making the search spaces SSs partly overlap between component carriers CCs, it is possible to suppress the increase of the number of CCEs of the search space SS even if the number of CC aggregations increases. Now, mapping to reduce the overlap of search spaces SSs between component carriers CCs will be described.

Assuming that the number of CCEs to match the bandwidth of the PDCCH is $N_{CCE}$, the size of the search space SS at each level of N_level={1, 2, 4, 8} is N_size={6, 12, 8, 16}, and the number of CCs is Ncc, the number of CCEs is sufficient when $N_{CCE}$ is greater than N_size×Ncc, and the search spaces SSs of individual component carriers CCs are mapped not to overlap. For example, the offset amount N_offset then is N_offset=N_size/N_level.

Also, when $N_{CCE}$ is smaller than N_size×Ncc, the number of CCEs is insufficient, and therefore the following amount of offset N_offset is calculated.

$$N_{offset} = \frac{N_{size}}{N_{level}} - \left[ \frac{\left(\frac{N_{size}}{N_{level}} Ncc\right) - \left[\frac{N_{CCE}}{N_{level}}\right]}{Ncc} \right] \quad \text{(Equation 1)}$$

Here, the unit of offset is the number of search spaces SSs at each level.

Figure 15:
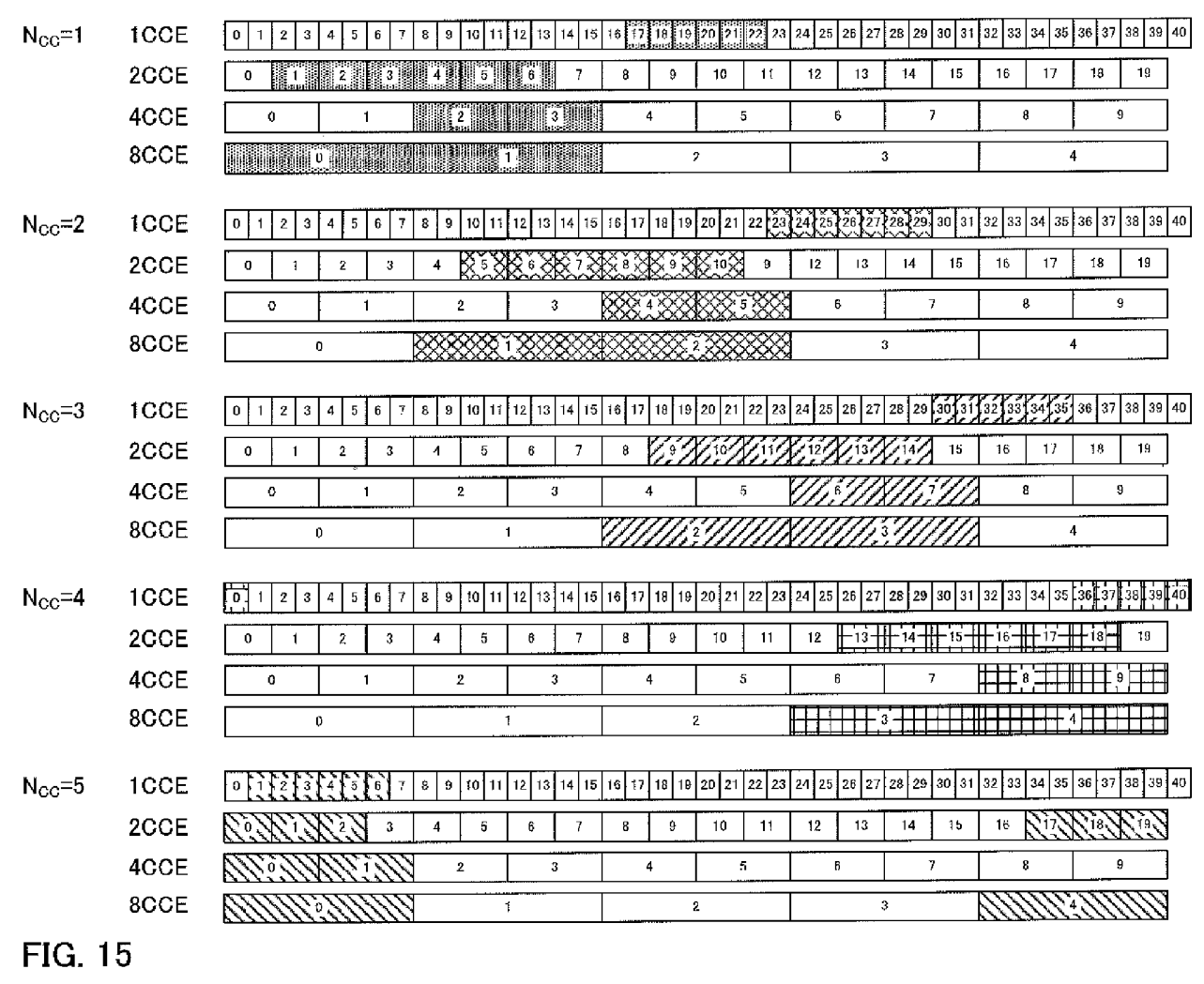

For example, a case of mapping search spaces SSs for the number of CCs Ncc=5 when $N_{CCE}$=41 will be examined as follows. When N_level=2 and 8, N_size×Ncc becomes 60 and 80 (>41), so that the offsets are calculated using the above equation. The offset amounts then are N_offset=4 and 1. FIG. 15 shows the search space of each component carrier when these offsets are applied. To examine the number of CCE aggregations=2, although, when Ncc=1, the starting position of the search space is SS number 1, when Ncc=2, the starting position of the search space is SS number 5, which is where an offset amount=4 is added to SS number 1. That is to say, the overlap of search spaces between Ncc=1 and Ncc=2 is the number of SSs=2. Between other CCs, the overlap of search spaces is the number of SSs=2. Also, to examine the number of CCE aggregations=8, although, when Ncc=1, the starting position of the search space is SS number 0, when Ncc=2, the starting position of the search space is SS number 1, which is where offset amount=1 is added to SS number 0. That is to say, the overlap of search spaces between Ncc=1 and Ncc=2 is the number of SSs=1.

Also, when there is no transmission data in the PDSCH of component carrier CCN, deactivation to reduce or make 0 the transmission power of the PDSCH is performed for the purpose of saving power. Even when the PDSCH is deactivated, only the PDCCH is activated (transmission of downlink control information is maintained at required transmission power).

According to another aspect of the present invention, the PDCCH of a component carrier is provided with ON/OFF functions for activation/deactivation. In the event the PDSCH of a given component carrier CC_N is deactivated, the PDCCH of that component carrier CC_N is also deactivated. Also, such design may also be possible where, given one component carrier CC_N alone, the PDSCH is ON (activated) but the PDCCH is OFF.

In the event a CIF is attached to DCI, when the PDSCH is OFF (deactivated), it is preferable to deactivate the user-specific search space for that PDSCH.

Now, an embodiment of the present invention will be described below in detail with reference to the accompanying drawings. Although a case of using base stations and mobile stations to support the LTE-A system will be described here, the present invention is also applicable to communication systems other than LTE.

Figure 16:
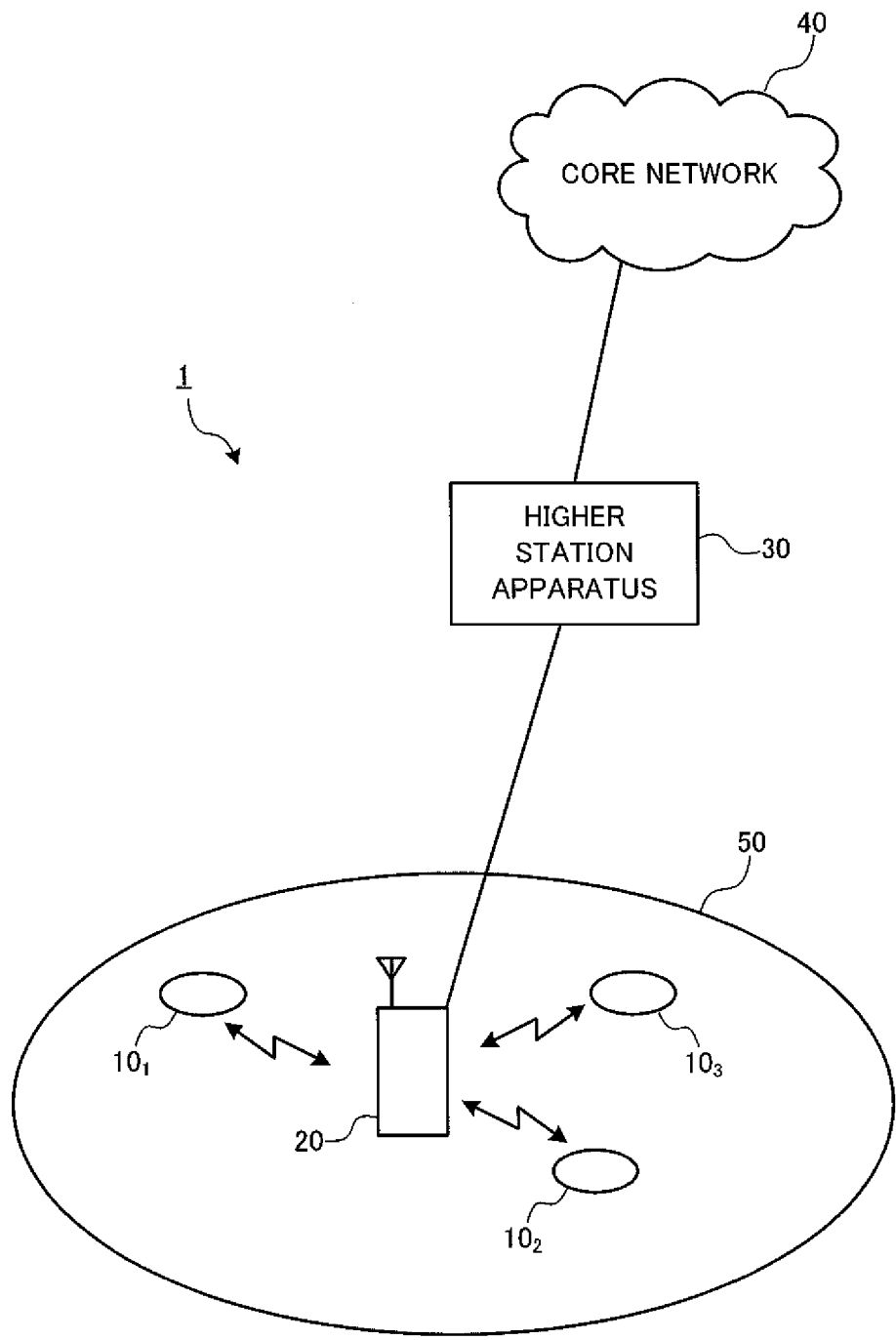
FIG. 16 is an overview of a mobile communication system according to an embodiment.

Referring to FIG. 16, a mobile communication system 1 having a mobile station (UE) 10 and a base station (Node B) 20 according to an embodiment of the present invention will be described. FIG. 16 is a diagram for explaining the configuration of the mobile communication system 1 having mobile stations 10 and a base station 20 according to the present embodiment. Note that the mobile communication system 1 illustrated in FIG. 16 is a system to accommodate, for example, the LTE system or SUPER 3G. Also, this mobile communication system 1 may be referred to as IMT-Advanced or may be referred to as 4G.

As illustrated in FIG. 16, the mobile communication system 1 is configured to include a base station apparatus 20 and a plurality of mobile terminal apparatuses 10 ($10_1$, $10_2$, $10_3$, ... $10_n$, where n is an integer to satisfy n>0) that communicate with this base station apparatus 20. The base station apparatus 20 is connected with a higher station apparatus 30, and this higher station apparatus 30 is connected with a core network 40. The mobile terminal apparatuses 10 are able to communicate with the base station apparatus 20 in a cell 50. Note that the higher station apparatus 30 includes, for example, an access gateway apparatus, a radio network controller (RNC), a mobility management entity (MME) and so on, but is by no means limited to these. The higher station apparatus 30 may be included in the core network 40.

The mobile terminal apparatuses ($10_1$, $10_2$, $10_3$, ... $10_n$) include LTE terminals and LTE-A terminals, and, the following descriptions will be given with respect to "mobile terminal apparatus 10," unless specified otherwise. Also, although the mobile terminal apparatus 10 performs radio communication with the base station apparatus 20 for ease of explanation, more generally, user apparatuses (UE: User Equipment) including mobile terminal apparatuses and fixed terminal apparatuses may be used as well.

In the mobile communication system 1, as radio access schemes, OFDMA (Orthogonal Frequency Division Multiple Access) is applied to the downlink, and SC-FDMA (Single-Carrier Frequency-Division Multiple Access) and clustered DFT-spread OFDM are applied to the uplink. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, a system band into bands formed with one or continuous resource blocks, and allowing a plurality of terminals to use mutually different bands. Clustered DFT-spread OFDM is a scheme to realize uplink multiple access by allocating groups (clusters) of discontinuous, clustered subcarriers to one mobile station UE and applying discrete Fourier transform spread OFDM to each cluster.

Here, the communication channels in the LTE and LTE-A systems will be described. The downlink communication channels include the PDSCH, which is used by each mobile terminal apparatus 10 on a shared basis, and downlink L1/L2 control channels (including the PDCCH, PCFICH and PHICH). This PDSCH transmits user data and higher control signals. The higher control signals include RRC signaling to report the increase/decrease of the number of carrier aggregations, the uplink radio access scheme (SC-FDMA/clustered DFT-spread OFDM) to be applied to each component carrier, and so on, to the mobile terminal apparatus 10. Also, in the event the mode to activate/deactivate the PDSCH and/or PDCCH is supported, signaling to turn the activation/deactivation of the PDSCH and PDCCH ON/OFF is included on a per-component carrier basis.

The uplink communication channels include PUSCH, which is used by each mobile terminal apparatus 10 on a shared basis, and the PUCCH (Physical Uplink Control Channel), which is an uplink control channel. User data is transmitted by this PUSCH. The PUCCH transmits downlink radio quality information (CQI: Channel Quality Indicator), ACK/NACK and so on, and, although intra-subframe frequency hopping applies in SC-FDMA, in clustered DFT-spread OFDM, intra-subframe frequency hopping does not apply, because a frequency scheduling effect can be achieved without intra-subframe frequency hopping.

Figure 17:
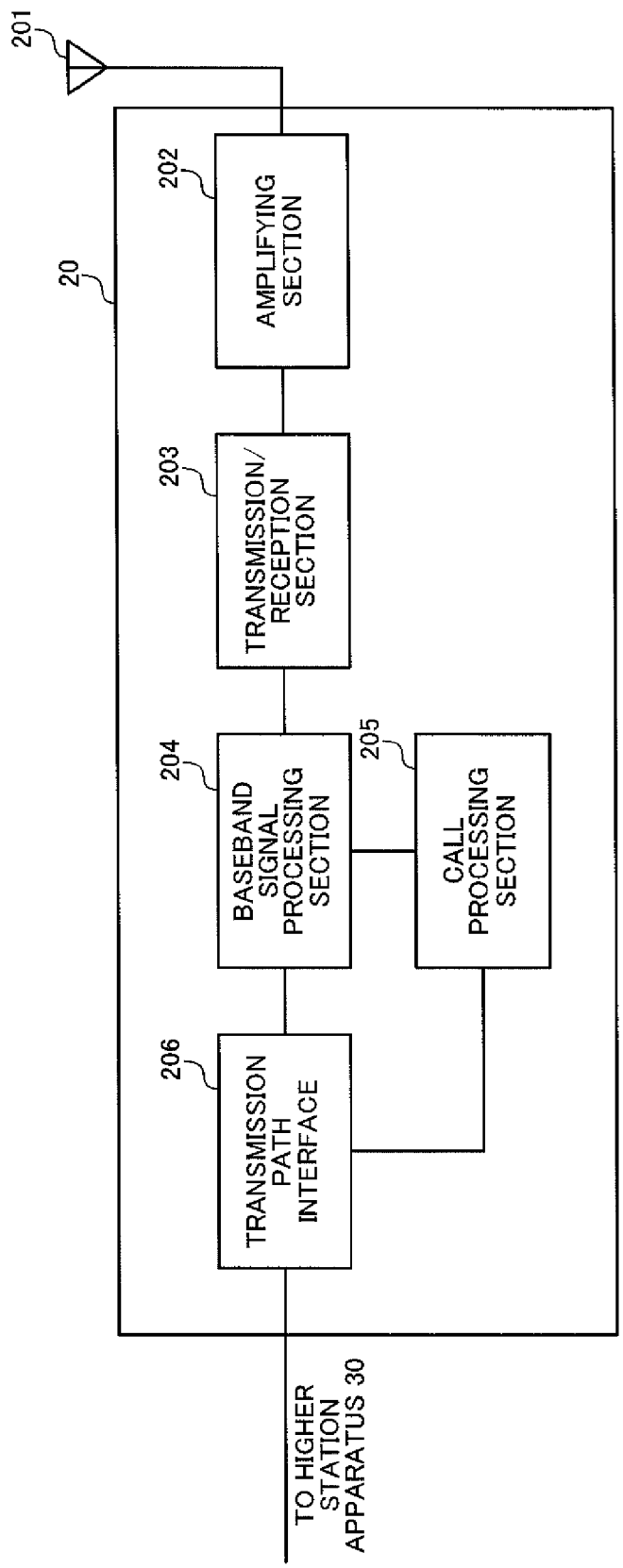
FIG. 17 is a schematic configuration diagram of a base station apparatus according to an embodiment.

According to the present embodiment, an overall configuration of the base station apparatus 20 will be described with reference to FIG. 17. The base station apparatus 20 has a transmission/reception antenna 201, an amplifying section 202, a transmission/reception section 203, a baseband signal processing section 204, a call processing section 205, and a transmission path interface 206.

User data to be transmitted from the base station apparatus 20 to the mobile terminal apparatus 10 on the downlink is input from the higher station apparatus 30 into the baseband signal processing section 204, via the transmission path interface 206.

In the baseband signal processing section 204, PDCP layer processing, division and coupling of user data, RLC (Radio Link Control) layer transmission processing such as RLC retransmission control transmission processing, MAC (Medium Access Control) retransmission control, including, for example, HARQ (Hybrid Automatic Repeat reQuest) transmission processing, scheduling, transport format selection, channel coding, inverse fast Fourier transform (IFFT) processing, and precoding processing, are performed. Furthermore, as with signals of the physical downlink control channel, which is a downlink control channel, transmission processing such as channel coding and inverse fast Fourier transform is performed.

Also, the baseband signal processing section 204 notifies control information for allowing each mobile terminal apparatus 10 to communicate with the base station apparatus 20, to the mobile terminal apparatuses 10 connected to the same cell 50, by a broadcast channel. Broadcast information for communication in the cell 50 includes, for example, the uplink or downlink system bandwidth, identification information of a root sequence (root sequence index) for generating random access preamble signals in the PRACH, and so on.

In the transmission/reception section 203, the baseband signal output from the baseband signal processing section 204 is subjected to frequency conversion into a radio frequency band. The amplifying section 202 amplifies the transmission signal subjected to frequency conversion, and outputs the result to the transmission/reception antenna 201.

Meanwhile, as for signals to be transmitted on the uplink from the mobile terminal apparatus 10 to the base station apparatus 20, a radio frequency signal that is received in the transmission/reception antenna 201 is amplified in the amplifying section 202, subjected to frequency conversion and converted into a baseband signal in the transmission/reception section 203, and is input to the baseband signal processing section 204.

The baseband signal processing section 204 performs FFT processing, IDFT processing, error correction decoding, MAC retransmission control reception processing, and RLC layer and PDCP layer reception processing of the user data included in the baseband signal that is received on the uplink. The decoded signal is transferred to the higher station apparatus 30 through the transmission path interface 206.

The call processing section 205 performs call processing such as setting up and releasing a communication channel, manages the state of the base station apparatus 20 and manages the radio resources.

Figure 18:
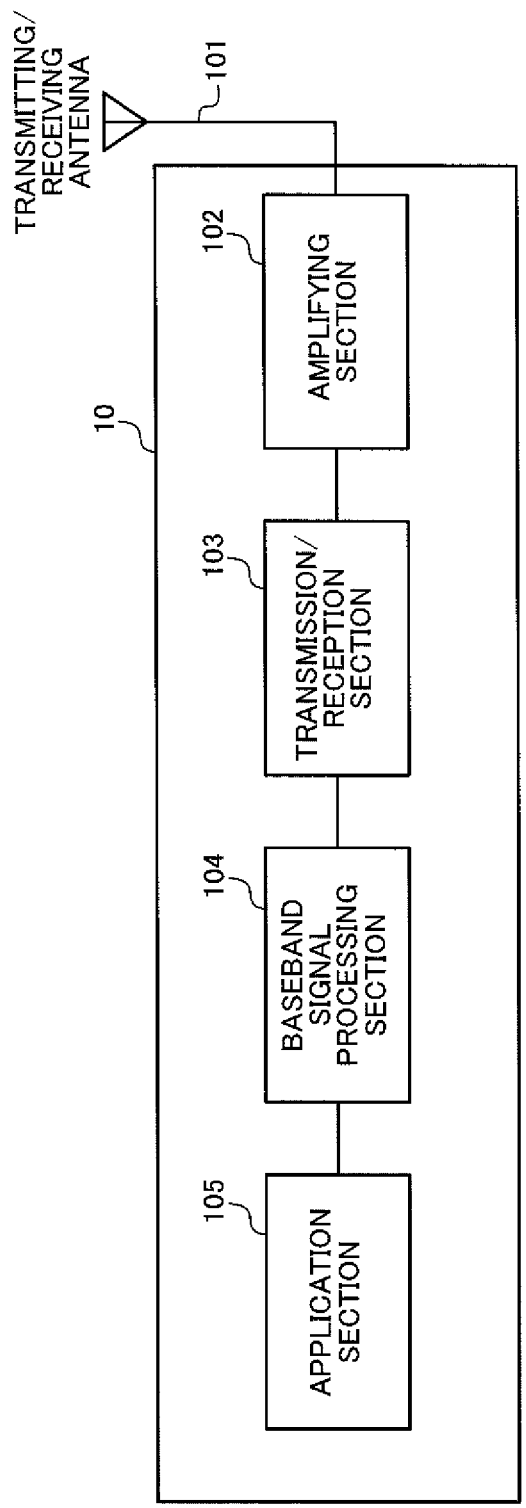
FIG. 18 is a schematic configuration diagram of a mobile terminal apparatus according to an embodiment.

Next, referring to FIG. 18, an overall configuration of the mobile terminal apparatus 10 according to the present embodiment will be described. An LTE terminal and an LTE-A terminal have the same hardware configurations in the principle parts, and therefore will be described indiscriminately. The mobile terminal apparatus 10 has a transmission/reception antenna 101, an amplifying section 102, a transmission/reception section 103, a baseband signal processing section 104, and an application section 105.

As for downlink data, a radio frequency signal received in the transmission/reception antenna 101 is amplified in the amplifying section 102, and subjected to frequency conversion and converted into a baseband signal in the transmission/reception section 103. This baseband signal is subjected to reception processing such as FFT processing, error correction decoding and retransmission control and so on in the baseband signal processing section 104. In this downlink data, downlink user data is transferred to the application section 105. The application section 105 performs processing related to higher layers above the physical layer and the MAC layer. Also, in the downlink data, broadcast information is also transferred to the application section 105.

On the other hand, uplink user data is input from the application section 105 to the baseband signal processing section 104. In the baseband signal processing section 104, retransmission control (H-ARQ (Hybrid ARQ)) transmission processing, channel coding, DFT processing, IFFT processing and so on are performed. The baseband signal output from the baseband signal processing section 104 is converted into a radio frequency band in the transmission/reception section 103, and, after that, amplified in the amplifying section 102 and transmitted from the transmission/reception antenna 101.

Figure 19:
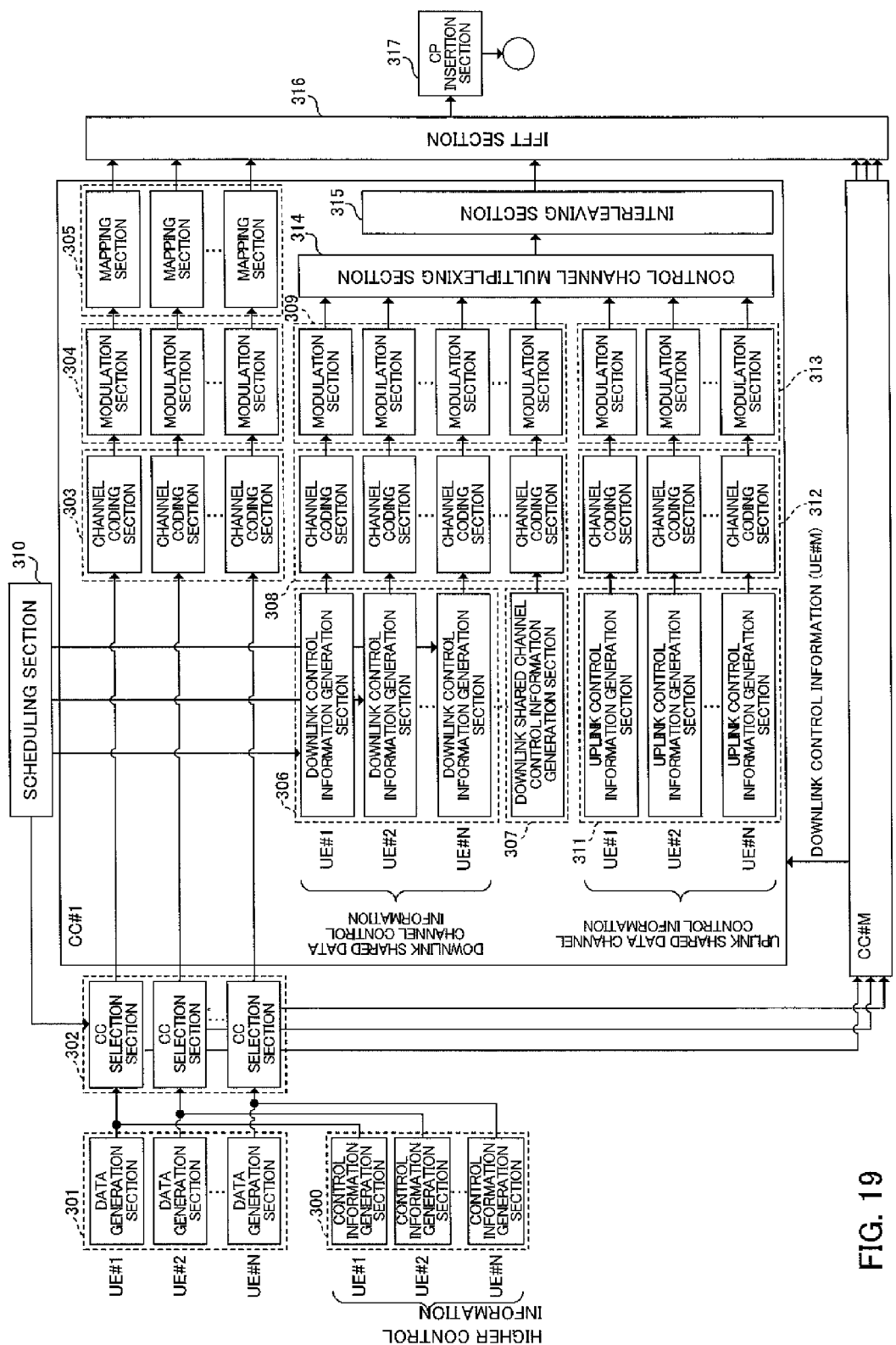
FIG. 19 is a functional block diagram of a transmission processing section in a baseband signal processing section of a base station apparatus according to an embodiment.

FIG. 19 is a functional block diagram of the baseband signal processing section 204 and part of the higher layers provided in the base station apparatus 20 according to the present embodiment, and primarily illustrates the function blocks of the transmission processing section in the baseband signal processing section 204. FIG. 19 illustrates an example of a base station configuration which can support maximum M (CC #1 to CC #M) component carriers. Transmission data for the mobile terminal apparatus 10 under the base station apparatus 20 is transferred from the higher station apparatus 30 to the base station apparatus 20.

A control information generation section 300 generates higher control signals for performing higher layer signaling (for example, RRC signaling), on a per-user basis. The higher control signals may include a command to request addition/removal of component carriers CC.

A data generation section 301 outputs the transmission data transferred from the higher station apparatus 30 separately as user data.

A component carrier selection section 302 selects component carriers to use in radio communication with the mobile terminal apparatus 10 on a per-user basis. As described above, addition/removal of component carriers is reported from the base station apparatus 20 to the mobile terminal apparatus 10 by RRC signaling, and a complete message is received from the mobile terminal apparatus 10. As this complete message is received, assignment (addition/removal) of component carriers to that user is fixed, and the fixed component carrier assignment is set in the component carrier selection section 302 as component carrier assignment information. In accordance with the component carrier assignment information that is set in the component carrier selection section 302 on a per-user basis, higher control signals and transmission data are allocated to a component carrier channel coding section 303 of the applicable component carrier. Also, a specific component carrier (hereinafter referred to as "SS-grouping component carrier"), in which search spaces from a plurality of component carriers are grouped, is selected from the component carriers to be used in radio communication with the mobile terminal apparatus 10.

A scheduling section 310 controls assignment of component carriers to a serving mobile terminal apparatus 10 according to overall communication quality of the system band. The scheduling section 310 determines addition/removal of component carriers to assign for communication with the mobile terminal apparatus 10. A decision result related to addition/removal of component carriers is reported to the control information generation section 300. Also, an SS-grouping component carrier is determined from the component carriers selected per user terminal. The SS-grouping component carrier may be switched dynamically or may be switched semi-statically.

Also, the scheduling section 310 controls resource allocation in component carriers CC #1 to CC #M. The LTE terminal user and the LTE-A terminal user are scheduled separately. Also, the scheduling section 310 receives as input the transmission data and retransmission command from the higher station apparatus 30, and also receives as input the channel estimation values and resource block CQIs from the reception section having measured an uplink received signal. The scheduling section 310 schedules downlink assignment information, uplink assignment information and uplink/downlink shared channel signals, with reference to the retransmission command, channel estimation values and CQIs that are received as input from the higher station apparatus 30. A propagation path in mobile communication varies differently per frequency, due to frequency selective fading. So, upon transmission of user data to the mobile terminal apparatus 10, resource blocks of good communication quality are assigned to each mobile terminal apparatus 10, on a per subframe basis (which is referred to as "adaptive frequency scheduling"). In adaptive frequency scheduling, for each resource block, a mobile terminal apparatus 10 of good propagation path quality is selected and assigned. Consequently, the scheduling section 310 assigns resource blocks, with which improvement of throughput is anticipated, using the CQI of each resource block, fed back from each mobile terminal apparatus 10. Also, the number of CCE aggregations is controlled according to the propagation path conditions with the mobile terminal apparatus 10. The number of CCE aggregations is increased with respect to cell edge users. Also, the MCS (Coding rate and Modulation Scheme) to fulfill a required block error rate with the assigned resource blocks is determined. Parameters to fulfill the MCS (Coding rate and Modulation Scheme) determined by the scheduling section 310 are set in channel coding sections 303, 308 and 312, and in modulation sections 304, 309 and 313.

The baseband signal processing section 204 has channel coding sections 303, modulation sections 304, and mapping sections 305, to match the maximum number of users to be multiplexed, N, in one component carrier. The channel coding section 303 performs channel coding of the shared data channel (PDSCH), formed with user data (including part of higher control signals) that is output from the data generation section 301, on a per-user basis. The modulation section 304 modulates user data having been subjected to channel coding, on a per-user basis. The mapping section 305 maps the modulated user data to radio resources.

Also, the baseband signal processing section 204 has a downlink control information generation section 306 that generates downlink shared data channel control information, which is user-specific downlink control information, and a downlink shared channel control information generation section 307 that generates downlink shared control channel control information, which is user-common downlink control information.

Downlink assignment information (D0) of DCI format 1 is downlink shared data channel control information. The downlink control information generation section 306 generates downlink control information (for example, DCI format 1), formed with downlink assignment information, from the resource allocation information, MCS information, HARQ information, PUCCH transmission power control command, and so on, determined on a per-user basis. The downlink control information (for example, DCI format 1) is arranged in the search space according to the present invention.

The baseband signal processing section 204 has channel coding sections 308 and modulation sections 309 to match the maximum number of users to be multiplexed, N, in one component carrier. The channel coding section 308 performs channel coding of control information generated in the downlink control information generation section 306 and the downlink shared channel control information generation section 307, on a per-user basis. The modulation section 309 modulates the downlink control information after channel coding.

Also, the baseband signal processing section 204 has an uplink control information generation section 311 that generates, on a per-user basis, uplink shared data channel control information, which is control information for controlling the uplink shared data channel (PUSCH), a channel coding section 312 that performs, on a per-user basis, channel coding of uplink shared data channel control information generated, and a modulation section 313 that modulates, on a per-user basis, uplink shared data channel control information having been subjected to channel coding.

The downlink control information (U0) formed with the uplink assignment information of DCI format 0 is uplink shared data channel control information. The uplink control information generation section 311 generates uplink assignment information from uplink resource allocation information (single carrier/cluster) that is determined per user, MCS information and redundancy version (RV), an identifier (new data indicator) to identify between new data and retransmission data, a PUCCH transmission power control command (TPC), cyclic shift for the demodulation reference signal (CS for DMRS), CQI request, and so on. In subframes (component carriers) where SC-FDMA is selected for the uplink radio access scheme, downlink control information (U0) formed with uplink assignment information of DCI format 0 is generated according to the rules defined in LTE. The downlink control information (for example, DCI format 0) is arranged in the search space according to the present invention.

The control information that is modulated on a per-user basis in the above modulation sections 309 and 313 is multiplexed in a control channel multiplexing section 314 and furthermore interleaved in an interleaving section 315. A control signal that is output from the interleaving section 315 and user data that is output from the mapping section 305 are input in an IFFT section 316 as downlink channel signals. The IFFT section 316 converts the downlink channel signal from a frequency domain signal into a time sequence signal by performing an inverse fast Fourier transform. A cyclic prefix insertion section 317 inserts cyclic prefixes in the time sequence signal of the downlink channel signal. Note that a cyclic prefix functions as a guard interval for cancelling the differences in multipath propagation delay. The transmission data to which cyclic prefixes are added is transmitted to the transmission/reception section 203.

Figure 20:
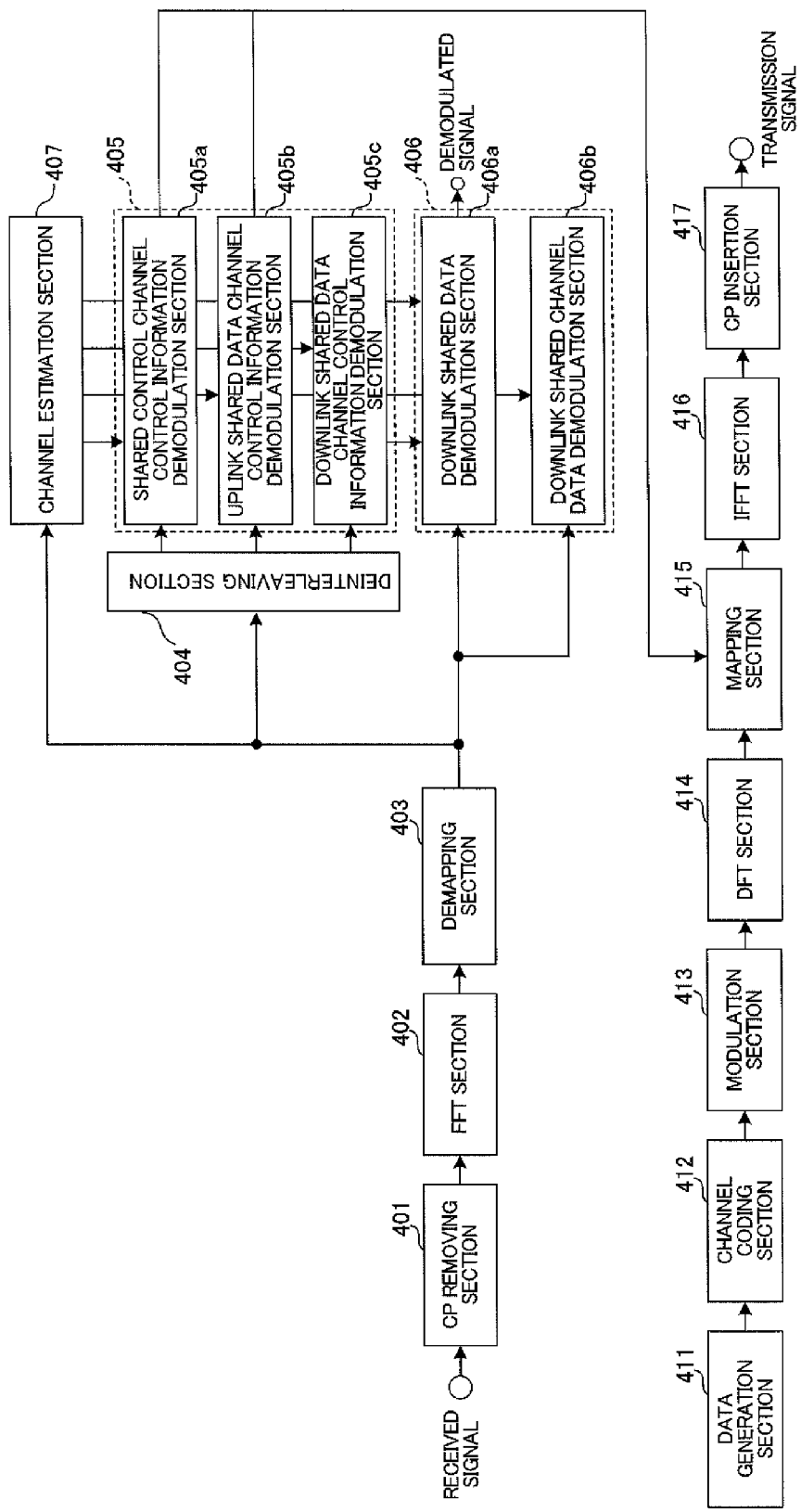
FIG. 20 is a functional block diagram of a baseband signal processing section provided in a mobile terminal apparatus according to an embodiment.

FIG. 20 is a functional block diagram of the baseband signal processing section 104 provided in the mobile terminal apparatus 10, illustrating function blocks of an LTE-A terminal which supports LTE-A. First, the downlink configuration of the mobile terminal apparatus 10 will be described.

A CP removing section 401 removes the CPs from a downlink signal received from the radio base station apparatus 20 as received data. The downlink signal, from which the CPs have been removed, is input into an FFT section 402. The FFT section 402 performs a fast Fourier transform (FFT) on the downlink signal, converts the time-domain signal into a frequency domain signal, and inputs the frequency domain signal in a demapping section 403. The demapping section 403 demaps the downlink signal, and extracts, from the downlink signal, multiplex control information in which a plurality of pieces of control information are multiplexed, user data, and higher control signals. Note that the demapping process by the demapping section 403 is performed based on higher control signals that are received as input from the application section 105. Multiplex control information that is output from the demapping section 403 is deinterleaved in a deinterleaving section 404.

Also, the baseband signal processing section 104 has a control information demodulation section 405 that demodulates control information, a data demodulation section 406 that demodulates downlink shared data, and a channel estimation section 407. The control information demodulation section 405 includes a shared control channel control information demodulation section 405a that demodulates downlink shared control channel control information from the downlink control channel, an uplink shared data channel control information demodulation section 405b that demodulates uplink shared data channel control information by performing blind decoding of the search space according to the present invention from the downlink control channel, and a downlink shared data channel control information demodulation section 405c that demodulates downlink shared data channel control information by performing blind decoding of the search space according to the present invention from the downlink control channel. The data demodulation section 406 includes a downlink shared data demodulation section 406a that demodulates the user data and higher control signals, and a downlink shared channel data demodulation section 406b that demodulates downlink shared channel data.

The shared control channel control information demodulation section 405a extracts shared control channel control information, which is user-common control information, by the blind decoding process, demodulation process, channel decoding process and so on of the common search space of the downlink control channel (PDCCH). The shared control channel control information includes downlink channel quality information (CQI), and therefore is input in a mapping section 115 (described later), and mapped as part of transmission data for the radio base station apparatus 20.

The uplink shared data channel control information demodulation section 405b extracts uplink shared data channel control information, which is user-specific uplink assignment information, by the blind decoding process, demodulation process, channel decoding process and so on, of the user-specific search spaces of the downlink control channel (PDCCH). In particular, as for the user-specific search spaces, as described above, the search spaces of a plurality of component carriers are grouped in the PDCCH of the SS-grouping component carrier, so that of which component carrier's control information the demodulated DCI is, is determined using the CIFs. The uplink assignment information is used to control the uplink shared data channel (PUSCH), and is input into the downlink shared channel data demodulation section 406b.

The downlink shared data channel control information demodulation section 405c extracts downlink shared data channel control information, which is user-specific downlink control signals, by the blind decoding process, demodulation process, channel decoding process and so on, of the user-specific search spaces of the downlink control channel (PDCCH). In particular, as for the user-specific search spaces, as described above, the search spaces of a plurality of component carriers are grouped in the PDCCH of the SS-grouping component carrier, so that which component carrier's control information demodulated DCI is, is determined using the CIFs. The downlink shared data channel control information is used to control the downlink shared data channel (PDSCH), and is input into the downlink shared data demodulation section 406.

Also, the downlink shared data channel control information demodulation section 405c performs the blind decoding process of the user-specific search spaces, based on information which relates to the PDCCH and PDSCH and which is included in the higher control signals demodulated in the downlink shared data demodulation section 406a. Information that relates to user-specific search spaces (which may include ON and OFF of activation/deactivation of the PDSCH/PDCCH) is signaled by higher control signals.

The downlink shared data demodulation section 406a acquires the user data, higher control information and so on, based on the downlink shared data channel control information received as input from the downlink shared data channel control information demodulation section 405c. The higher control information (including mode information) is output to the channel estimation section 407. The downlink shared channel data demodulation section 406bc demodulates downlink shared channel data based on the uplink shared data channel control information that is input from the uplink shared data channel control information demodulation section 405b.

The channel estimation section 407 performs channel estimation using common reference signals. The estimated channel variation is output to the shared control channel control information demodulation section 405a, the uplink shared data channel control information demodulation section 405b, the downlink shared data channel control information demodulation section 405c and the downlink shared data demodulation section 406a. These demodulation sections demodulate downlink allocation information using the estimated channel variation and demodulation reference signals.

The baseband signal processing section 104 has, as function blocks of the transmission processing system, a data generation section 411, a channel coding section 412, a modulation section 413, a DFT section 414, a mapping section 415, an IFFT section 416, and a CP insertion section 417. The data generation section 411 generates transmission data from bit data that is received as input from the application section 105. The channel coding section 412 applies channel coding processing such as error correction to the transmission data, and the modulation section 413 modulates the transmission data subjected to channel coding by QPSK and so on. The DFT section 414 performs a discrete Fourier transform on the modulated transmission data. The mapping section 415 maps the frequency components of the data symbols after the DFT, to the subcarrier positions designated by the base station apparatus. The IFFT section 416 performs an inverse fast Fourier transform on input data to match the system band and converts the input data into time sequence data, and the CP insertion section 417 inserts cyclic prefixes in the time sequence data per data segment.

Next, the control of search spaces to arrange downlink control information (DCI) of CC0 to CC3 in the event a plurality of component carriers CC0 to CC3 are allocated to the system band to use in radio communication between the mobile station apparatus 10 and the base station apparatus 20 will be described in detail.

The operation of arranging downlink control information (DCI) for CC0 to CC3 in the search spaces shown in FIG. 5B will be described. The control information generation section 300 (UE #1) for UE #1 signals the component carriers CC0 to CC3 to constitute the system band, to the mobile station apparatus 10, by RRC signaling, with higher control signals. Also, the control information generation section 300 (UE #1) signals SS-grouping component carrier CC0, which groups the search spaces of a plurality of component carriers, to the mobile station apparatus 10, by RRC signaling, with higher control signals. Then, as shown in FIG. 12A, when the search spaces of the component carriers are arranged based on the starting position of the search space of component carrier CC1 to send the PDCCH, RRC signaling is made using the component carrier number (CC1) to send the PDCCH, the component carrier numbers (CC2, CC3) to send the PDSCH, and higher control signals.

Also, if a component carrier to deactivate the PDSCH is included, the control information generation section 300 (UE #1) signals the CC number of the component carrier to be deactivated, by RRC signaling. Higher control signals to be signaled by RRC signaling are arranged in the PDSCH and sent.

In the baseband processing section 204, the downlink control information generation section 306 (UE #1) for component carriers CC0 to CC3 generates control information D0 to D3, and the uplink control information generation section 311 (UE #1) generates control information U0 to U3. A CIF is attached to each of control information D0 to D3 and U0 to U3. The generate control information are passed to the downlink control information generation section 306 (UE #1) and uplink control information generation section 311 (UE #1) of the SS-grouping component carrier (CC0). The downlink control information generation section 306 (UE #1) and uplink control information generation section 311 (UE #1) of the SS-grouping component carrier (CC0) arrange control information D0 to D3 and U0 to U3 in the search spaces formed as shown in FIG. 5B. The search spaces shown in FIG. 5B are two types: normal-size SS1 and compact-size SS2.

Also, downlink control information generation section 306 (UE #1) and uplink control information generation section 311 (UE #1) determine the sizes of the search spaces by applying one of the schemes from FIG. 12 to FIG. 15. With the scheme shown in FIG. 12, the basic size (6 CCEs) is simply made N-fold by the number of component carriers N. With the scheme shown in FIG. 13, when the number of CCs is 1 to 3, the size making the basic size (6 CCEs) N-fold by the number of component carriers N is used, and, when the number of CCs is greater than that, the size at the number of CCs=3 is fixed. With the scheme shown in FIG. 14, the search space sizes are configured to partly overlap between component carriers by applying CC-specific offsets. With the scheme shown in FIG. 15, mapping is performed to reduce the overlap between component carriers.

Control information (D0 or D0') that is generated in the downlink control information generation section 306 (UE #1) and control information (U0 or U0') that is generated in the uplink control information generation section 311 (UE #1) are multiplexed in the control channel multiplexing section 314 not to overlap, and the state of search space arrangement shown in FIG. 5B is assumed. In this way, the PDCCH of the SS-grouping component carrier CC0, in which control information D0 to D3 and U0 to U3 are arranged in the search spaces, is transmitted.

Also, in the event a component carrier to deactivate the PDSCH is included, the search space to arrange the control information for that deactivated component carrier is also deactivated. FIG. 12B shows a state in which the component carrier CC2 is deactivated. The downlink control information generation section 306 controls not to arrange control information or allocate transmission power to the search space of the component carrier CC2 where PDSCH is deactivated.

Note that it is also possible to deactivate the PDCCH of the component carrier in which the PDSCH is deactivated concurrently. The control information generation section 300 generates channel "OFF" information with respect to the deactivated PDSCH and/or PDCCH and signals this to the mobile terminal apparatus 10 by RRC signaling.

Meanwhile, the mobile terminal apparatus 10 to be user UE #1 receives the PDCCH on the downlink. The deinterleaving section 404 de-interleaves the PDCCH mapped to the first through third OFDM symbols at the top of the subframe. The rate matching parameter (the number of CCEs) and the CCE starting position are not clear in the mobile terminal apparatus 10, and therefore the control information demodulation section 405 performs blind decoding per CCE and searches for a CCE where the CRC masked by the user ID is "OK".

The downlink shared data channel control information demodulation section 405a searches for shared data channel control information for the subject apparatus by performing blind decoding of search space SS1 of the PDCCH. Then, since SS-grouping component carrier CC0 has already been reported, PDCCH blind decoding is not performed with respect to the component carriers CC1 to CC3 where the PDCCH is not transmitted. Control information D0 to D3 is demodulated by performing blind decoding of the search space SS1. Control information of component carriers CC1 to CC3 is specified based on the CIFs attached to the control information D0 to D3.

The uplink shared data channel control information demodulation section 405b searches for shared data channel control information for the subject apparatus by performing blind decoding of the search space SS2 of the PDCCH. For component carriers CC1 to CC3 where the PDCCH is not sent, PDCCH blind decoding is not performed. Control information U0 to U3 is demodulated by performing blind decoding of the search space SS2. Control information of component carriers CC1 to CC3 is specified based on the CIFs attached to the control information U0 to U3.

The uplink shared data channel control information demodulation section 405b interprets the searched control information U0 to U3 for the subject apparatus. Then, resource allocation information and other parameters (MCS information and so on) are extracted from DCI format 0. The resource allocation information is given to the mapping section 415, and the other parameters are given to the applicable blocks such as the channel coding section 412, modulation section 413 and so on.

When downlink control information (DCIs) for CC0 to CC3 are arranged in the search spaces shown in FIG. 5C, the component carrier CC0 is signaled as the anchor carrier. The anchor carrier is recognized between the mobile station apparatus 10 and the base station apparatus 20. The downlink control information generation section 306 (UE #1) and the uplink control information generation section 311 (UE #1) arrange control information D0 and U0 of the anchor carrier in the search spaces without attaching CIFs.

In the mobile terminal apparatus 10, the downlink shared data channel control information demodulation section 405a and the uplink shared data channel control information demodulation section 405b can recognize that control information D0 and U0 without CIFs are control information for the component carrier CC0 (anchor carrier).

Note that, as shown in FIGS. 6B and 6C, when a plurality of component carriers CC1 to CC3 to constitute the system band is grouped according to the DCI size, the SS-grouping component carrier is determined on a per-group basis, and the search space control shown in FIG. 5B or FIG. 5C is performed on a per-group basis. Then, the CC numbers of the SS-grouping component carrier, which becomes the CC to send the PDSCH, and the CC to send to PDSCH, are signaled by RRC signaling, on a per-group basis.

Also, as shown in FIG. 7, it is equally possible to define three types of blind decoding and provide a search space per blind decoding type.

FIG. 7 provides three types of search spaces SS1, SS2 and SS3, per component carrier. In the event multiple frequency bands are used for an uplink radio access scheme, control information (U0), formed with uplink assignment information, is generated in DCI format 0A of a larger size than compact-type DCI format 0. If DCI format 0A of a large size is commanded from the scheduling section 310, the uplink control information generation section 311 generates control information (U0), formed with uplink assignment information, in DCI format 0A. Control information (U0) generated in DCI format 0A of a large size is arranged in the third search space SS3.

In the mobile terminal apparatus 10, the uplink shared data channel control information demodulation section 405b performs blind decoding of the third search space SS3 and demodulates the control information (U0) generated in DCI format 0A.

Note that, as shown in FIG. 8, it is equally possible to support the compact-type second search space SS2 only in the anchor carrier (CC0). The anchor carrier (CC0) adopts a search space configuration in which fallback from DCI format 0A of a large size to DCI format 0 of a compact size is possible. If fallback to DCI format 0 is commanded from the scheduling section 310, the uplink control information generation section 311 switches the generation of control information, including uplink assignment information, to compact-size DCI format 0, and arranges compact-size control information (U0') in the second search space SS2.

Also, when allocation is asymmetric between the uplink and the downlink as with component carrier CC1 shown in FIGS. 9 and 10, it is preferable to select one from above options 1 to 3. For example, a case of selecting option 2 in FIG. 10 will be explained. The downlink control information generation section 306 (UE #1) uses the search space shown in option 2 in FIG. 10 when control information (D1') is generated in compact-size DCI format 1A. That is to say, the compact-size search space SS2, where uplink control information (UL) is not allocated and control information (D1') alone is allocated, is arranged in the PDCCH of the asymmetric component carrier CC1.

In the mobile terminal apparatus 10, the downlink shared data channel control information demodulation section 405a performs blind decoding of the second search space SS2 and demodulates control information (D0') generated in DCI format 1A.

Note that, when option 3 of FIG. 10 is selected, control information (D0') is not arranged in the search space SS2, and DCI format 1 of a normal size alone is arranged in the first search space SS1 and sent.

The disclosure of Japanese Patent Application No. 2010-087383, filed on Apr. 5, 2010, including the specification, drawings, and abstract, is incorporated herein by reference in its entirety.

The invention claimed is:

1. A user terminal that communicates with a base station apparatus using carrier aggregation where a plurality of component carriers are aggregated; the user terminal comprising:
   a receiving section configured to receive a downlink control channel of a specific component carrier; and
   a demodulation section configured to perform blind decoding of search spaces of the respective component carriers arranged in the downlink control channel to demodulate downlink control information of the component carriers,
   wherein, when a shared channel of one component carrier out of the component carriers is deactivated, a search space to arrange downlink control information of the one component carrier is deactivated without influencing a position of a search space of each of other activated component carriers.

2. The user terminal as defined in claim 1, wherein the search spaces of the respective component carriers are consecutively arranged in the downlink control channel of the specific component carrier.

3. The user terminal as defined in claim 1, wherein, when the shared channel of the one component carrier is deactivated, a downlink control channel of the one component carrier is deactivated.

4. The user terminal as defined in claim 2, wherein, when the shared channel of the one component carrier is deactivated, a downlink control channel of the one component carrier is deactivated.

5. A base station apparatus that communicates with a user terminal using carrier aggregation where a plurality of component carriers are aggregated; the base station apparatus comprising:
- a downlink control information generation section configured to arrange downlink control information of the component carriers in respective search spaces arranged in a downlink control channel of a specific component carrier; and
- a transmission section configured to transmit the downlink control information of the component carriers using the downlink control channel of the specific component carrier,
- wherein, when a shared channel of one component carrier out of the component carriers is deactivated, a search space to arrange downlink control information of the one component carrier is deactivated without influencing a position of a search space of each of other activated component carriers.

6. A communication control method for communication using carrier aggregation where a plurality of component carriers are aggregated; the communication control method comprising the steps of:
- in a user terminal, receiving a downlink control channel of a specific component carrier; and performing blind decoding of search spaces of the respective component carriers arranged in the downlink control channel to demodulate downlink control information of the component carriers,
- wherein, when a shared channel of one component carrier out of the component carriers is deactivated, a search space to arrange downlink control information of the one component carrier is deactivated without influencing a position of a search space of each of other activated component carriers.

* * * * *